United States Patent
Yang et al.

(10) Patent No.: US 9,571,829 B2
(45) Date of Patent: Feb. 14, 2017

(54) METHOD AND DEVICE FOR ENCODING/DECODING WITH QUANTIZATION PARAMETER, BLOCK SIZE AND CODING UNIT SIZE

(71) Applicant: Huawei Technologies Co., Ltd., Shenzhen, Guangdong (CN)

(72) Inventors: Haitao Yang, Shenzhen (CN); Chao Pang, Shenzhen (CN); Zilian Ou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 663 days.

(21) Appl. No.: 14/024,047

(22) Filed: Sep. 11, 2013

(65) Prior Publication Data

US 2014/0079117 A1 Mar. 20, 2014

Related U.S. Application Data

(63) Continuation of application No. PCT/CN2011/081102, filed on Oct. 21, 2011.

(30) Foreign Application Priority Data

Mar. 11, 2011 (CN) .......................... 2011 1 0059194

(51) Int. Cl.
*H04N 7/12* (2006.01)
*H04N 19/124* (2014.01)
(Continued)

(52) U.S. Cl.
CPC ........ *H04N 19/0009* (2013.01); *H04N 19/124* (2014.11); *H04N 19/149* (2014.11);
(Continued)

(58) Field of Classification Search
CPC ................................................. H04N 19/0009
(Continued)

(56) References Cited

U.S. PATENT DOCUMENTS

| 6,275,533 B1 | 8/2001 | Nishi |
| 2004/0223551 A1 | 11/2004 | Hannuksela |

(Continued)

FOREIGN PATENT DOCUMENTS

| CN | 1212561 A | 3/1999 |
| CN | 101453643 A | 6/2009 |

(Continued)

OTHER PUBLICATIONS

G. J. Sullivan, Annex A to meeting report of the fifth meeting of the Joint Collaborative Team on Video Coding (JCT-VC) Mar. 16-23, 2011, Jul. 19, 2011, 32 pages.

(Continued)

*Primary Examiner* — Richard Torrente

(57) ABSTRACT

An encoding includes: obtaining, by an encoder, data to be encoded, where the data to be encoded is at least one LCU; determining, a quantization depth parameter of the LCU according to a preset bit rate control algorithm, and adding the quantization depth parameter into the data to be encoded; determining, a QP of each CU according to a size of a minimum picture block and a size of each CU included in the LCU; calculating, by the encoder, a QP difference of each CU according to the QP of each CU and a QP prediction value of each CU; for each CU that satisfies a preset condition, carrying, by the encoder, the QP difference of the CU in the CU; and encoding, by the encoder, the quantization depth parameter, the QP difference of the CU that satisfies the preset condition, and each CU to obtain a bit stream.

19 Claims, 11 Drawing Sheets

(51) Int. Cl.

| | |
|---|---|
| *H04N 19/176* | (2014.01) |
| *H04N 19/196* | (2014.01) |
| *H04N 19/149* | (2014.01) |
| *H04N 19/46* | (2014.01) |
| *H04N 19/115* | (2014.01) |
| *H04N 19/96* | (2014.01) |

(52) U.S. Cl.
CPC ......... *H04N 19/176* (2014.11); *H04N 19/196* (2014.11); *H04N 19/115* (2014.11); *H04N 19/46* (2014.11); *H04N 19/96* (2014.11)

(58) Field of Classification Search
USPC .................................................... 375/240.03
See application file for complete search history.

(56) References Cited

U.S. PATENT DOCUMENTS

| | | | |
|---|---|---|---|
| 2005/0254719 | A1 | 11/2005 | Sullivan |
| 2009/0296808 | A1 | 12/2009 | Regunathan et al. |
| 2010/0295922 | A1 | 11/2010 | Cheung et al. |
| 2012/0114034 | A1* | 5/2012 | Huang ................... H04N 19/70 375/240.03 |

FOREIGN PATENT DOCUMENTS

| | | |
|---|---|---|
| CN | 101888550 A | 11/2010 |
| CN | 101938657 A | 1/2011 |
| CN | 101978697 A | 2/2011 |
| JP | 2013542689 A | 11/2013 |
| RU | 2375839 C2 | 12/2009 |
| RU | 2395174 C1 | 7/2010 |
| WO | WO 2009/105732 A1 | 8/2009 |
| WO | WO 2009/158113 A2 | 12/2009 |
| WO | WO 2012/062161 A1 | 5/2012 |

OTHER PUBLICATIONS

"Internet timestamp for document JCTVC-E051", Sep. 22, 2014, 1 page.

Tzu-Der Chuang, et al., "AhG Quantization: Sub-LCU Delta QP", MediaTek Inc., Joint Collaborative Team on Video Coding (JCT-VC) of ITU-T SG16 WP3 and ISO/IEC JTC1/SC29/WG11, Mar. 16-23, 2011, 6 pages.

Kazushi Sato, "Proposal on Large Block Structure and Quantization", Sony Corp., Joint Collaborative Team on Video Coding (JCT-VC) of ITU-T SG16 WP3 and ISO/IEC JTC1/SC29/WG11, Oct. 7-15, 2010, 8 pages.

Masaaki Kobayashi, et al., "Sub-LCE level delta QP signaling", Joint Collaborative Team on Video Coding (JCT-VC) of ITU-T SG16 WP3 and ISO/IEC JTC1/SC29/WG11, Mar. 16-23, 2011, 9 pages.

Hirofumi Aoki, et al., "Prediction-based QP derivation", Joint Collaborative Team on Video Coding (JCT-VC) of ITU-T SG16 WP3 and ISO/IEC JTC1/SC29/WG11, Mar. 16-23, 2011, 11 pages.

Chao Pang, et al., "Sub-LCU QP representation", Joint Collaborative Team on Video Coding (JCT-VC) of ITU-T SG16 WP3 and ISO/IEC JTC1/SC29/WG11, Mar. 16-23, 2011, 5 pages.

International Search Report dated Feb. 2, 2012 in connection with International Patent Application No. PCT/CN2011/081102.

L. Dong, et al., "CU Adaptive Quantization Syntax Change for Better Decoder pipelining", Sony Electronics, Joint Collaborative Team on Video Coding (JCT-VC) of ITU-T SG16 WP3 and ISO/IEC JTC1/SC29/WG11, Jan. 20-28, 2011, 3 pages.

Madhukar Budagavi, et al., "Delta QP signaling at sub-LCU level", Joint Collaborative Team on Video Coding (JCT-VC) of ITU-T SG16 WP3 and ISO/IEC JTC1/SC29/WG11, Jan. 20-28, 2011, 5 pages.

Kazushi Sato, "On LBS and Quantization", Joint Collaborative Team on Video Coding (JCT-VC) of ITU-T SG16 WP3 and ISO/IEC JTC1/SC29/WG11, Jan. 20-28, 2011, 12 pages.

* cited by examiner

METHOD AND DEVICE FOR ENCODING/DECODING WITH QUANTIZATION PARAMETER, BLOCK SIZE AND CODING UNIT SIZE

CROSS-REFERENCE TO RELATED APPLICATIONS

This application is a continuation of International Application No. PCT/CN2011/081102, filed on Oct. 21, 2011, which claims priority to Chinese Patent Application No. 201110059194.9, filed on Mar. 11, 2011, both of which are hereby incorporated by reference in their entireties.

TECHNICAL FIELD

The present invention relates to the field of data processing, and in particular, to an encoding method and device, and a decoding method and device.

BACKGROUND

In a video picture encoding process in the prior art, an encoder needs to perform a spatial transform for original picture block data or predicted picture block difference data, perform a quantization operation for a transform coefficient, and then perform entropy encoding for the quantized coefficient. A decoder performs an inverse quantization operation for the coefficient obtained after entropy decoding, reconstructs the coefficient to obtain a transform coefficient, and then performs an inverse transform operation to obtain the original picture block data or picture block difference data.

To perform an inverse quantization operation, the decoder needs to obtain a quantization step (QStep) used in the quantization process at the encoder. Therefore, the encoder needs to write information about the used Qstep into a bit stream. Because different Qsteps may be indicated by different quantization parameters (QP, Quantization Parameter), the encoder may encode the QP and transmit it to the decoder.

In a high efficiency video coding test model (HM, High efficiency video coding test Model), a picture is divided into largest coding units (LCU, Largest Coding Unit) of an equal size, where each LCU may include one or more CUs of non-fixed sizes.

In a picture encoding method in the prior art, a minimum block allowed to have an independent QP is an LCU, that is, each LCU corresponds to a QP.

During encoding, the encoder describes QP related information in a picture parameter set (PPS, Picture Parameter Set) as follows:

```
pic_parameter_set_rbsp( ) {
    ...
    pic_init_qp_minus26 /* relative to 26 */
    ...
}
```

The description in a slice header (SH, Slice Header) is:

```
slice_header( ) {
    ...
    slice_qp_delta
    ...
}
```

The description in an LCU is:

```
coding_tree( x0, y0, log2CUSize ) {
    ...
    if( !skip_flag[ x0 ][ y0 ] )
        lcu_qp_delta
    ...
}
```

After the encoder completes encoding in the preceding manner, the encoded data is sent to the decoder. For each LCU, the decoder calculates the quantization parameter $QP_{LCU}$ of the current LCU in the following manner:

$QP_{LCU}$=lcu_qp_delta+slice_qp_delta+pic_init_qp_minus26+26.

The decoder may perform decoding after obtaining the $QP_{LCU}$ of the current LCU.

As may be seen from the solution of the prior art:

In the prior art, each LCU corresponds to a QP; when performing bit rate control by adjusting the QP, the encoder can only use the LCU as the finest granularity for control. Because the LCU in actual applications is usually set to a large size, for example, 64*64 pixels (which is hereinafter abbreviated to 64*64 for ease of description; other data is similar to this), the solution of the prior art affects the precision of bit rate control.

In another picture encoding method in the prior art, each CU in an LCU carries qp_delta information of the CU, so that the precision of bit rate control may be improved.

However, in the prior art, because the minimum CU may be set to 8*8, if each CU carries the qp_delta information of the CU, the encoding overhead is greatly increased, and hence the overall compression efficiency in picture encoding is affected.

SUMMARY

Embodiments of the present invention provide an encoding method and device, a decoding method and device, and an encoding/decoding system, which can effectively improve the precision of bit rate control and compression efficiency.

An encoding method provided by an embodiment of the present invention includes: obtaining, by an encoder, data to be encoded, where the data to be encoded is at least one largest coding unit (LCU); determining, by the encoder, a quantization depth parameter of the LCU according to a preset bit rate control algorithm, and writing the quantization depth parameter into the data to be encoded, where the quantization depth parameter is used to indicate a size of a minimum picture block having an independent QP in the LCU; determining, by the encoder, a QP of each CU according to the size of the minimum picture block and a size of each CU included in the LCU; calculating, by the encoder, a QP difference of each CU according to the QP of each CU and a QP prediction value of each CU; for each CU that satisfies a preset condition, carrying, by the encoder, the QP difference of the CU in the CU; and encoding, by the encoder, the quantization depth parameter, the QP difference of the CU that satisfies the preset condition, and each CU to obtain a bit stream.

A decoding method provided by an embodiment of the present invention includes: parsing, by a decoder, a received bit stream to obtain a quantization depth parameter, where the quantization depth parameter is used to indicate a size of a minimum picture block having an independent QP in an LCU; calculating, by the decoder, a QP prediction value of each CU according to the size of the minimum picture block and a size of each CU included in the LCU; for each CU that satisfies a preset condition, parsing, by the decoder, the bit stream to obtain a QP difference of the CU; calculating, by the decoder, a QP of each CU according to the QP prediction value of each CU and the QP difference obtained by parsing; and decoding, by the decoder, each CU according to the QP of each CU.

An encoding device provided by an embodiment of the present invention includes: a data obtaining unit, configured to obtain data to be encoded, where the data to be encoded is at least one largest coding unit LCU; a depth parameter processing unit, configured to determine a quantization depth parameter of the LCU according to a preset bit rate control algorithm, and write the quantization depth parameter into the data to be encoded which is obtained by the data obtaining unit, where the quantization depth parameter is used to indicate a size of a minimum picture block having an independent QP in the LCU; a quantization parameter determining unit, configured to determine a QP of each CU according to the size of the minimum picture block and a size of each CU included in the LCU; a calculating unit, configured to calculate a QP difference of each CU according to the QP of each CU determined by the quantization parameter determining unit and a QP prediction value of each CU; a filling unit, configured to carry, for each CU that satisfies a preset condition, the QP difference of the CU in the CU; and an encoding unit, configured to encode the quantization depth parameter, the QP difference of the CU that satisfies the preset condition, and each CU to obtain a bit stream.

A decoding device provided by an embodiment of the present invention includes: a first parsing unit, configured to parse a received bit stream to obtain a quantization depth parameter, where the quantization depth parameter is used to indicate a size of a minimum picture block having an independent QP in an LCU; a parameter predicting unit, configured to calculate a QP prediction value of each CU according to the size of the minimum picture block and a size of each CU included in the LCU; a second parsing unit, configured to parse, for each CU that satisfies a preset condition, the bit stream to obtain a QP difference of the CU; a parameter calculating unit, configured to calculate a QP of each CU according to the QP prediction value of each CU obtained by the parameter predicting unit and the QP difference obtained by parsing by the second parsing unit; and a decoding unit, configured to decode each CU according to the QP of each CU obtained by calculation by the parameter calculating unit.

As can be seen from the above technical solutions, the embodiments of the present invention have the following advantages:

In the embodiments of the present invention, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP but the CU that satisfies the preset condition in the LCU corresponds to the QP. Therefore, the encoder can use the CU as the finest granularity for bit rate control. Because one LCU usually includes multiple CUs, the precision of bit rate control of the LCU can be effectively improved.

In addition, the encoder carries the QP difference of the CU only in the CU that satisfies the preset condition, but does not carry the QP difference in all CUs. Therefore, the encoding overhead may be decreased, and hence the overall compression efficiency is improved.

DESCRIPTION OF EMBODIMENTS

Embodiments of the present invention provide an encoding method and device, and a decoding method and device, which can effectively improve the precision of bit rate control and compression efficiency.

Figure 1:
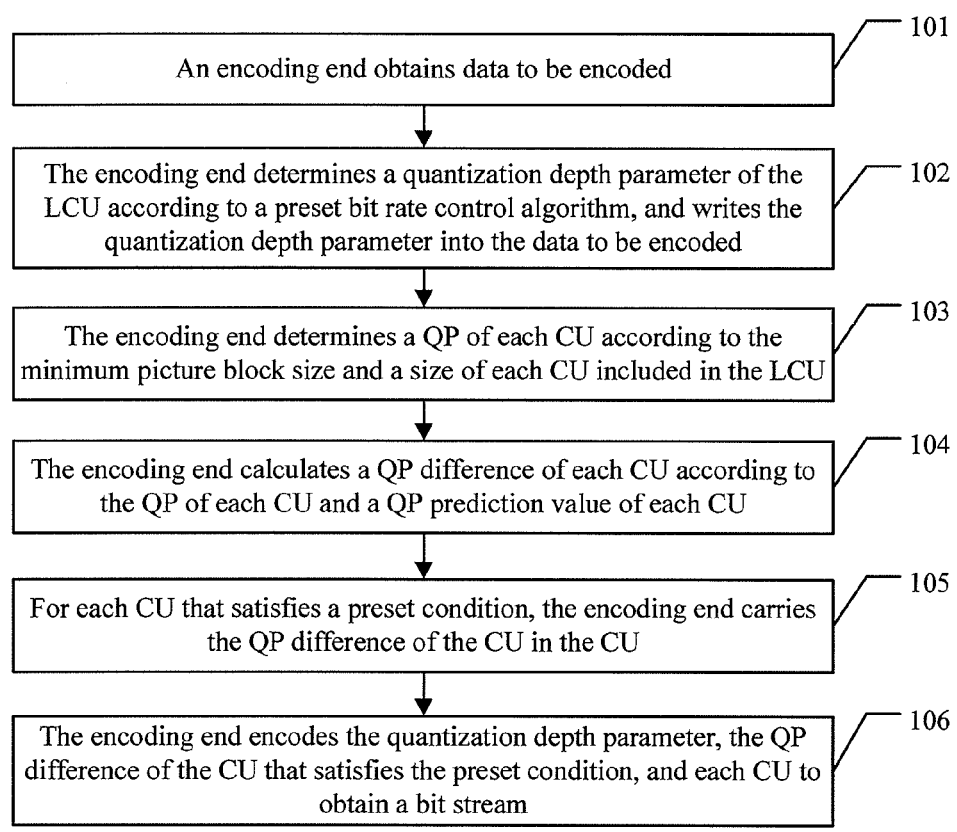
FIG. 1 is a schematic diagram of an embodiment of an encoding method according to the present invention.

Referring to FIG. 1, an embodiment of an encoding method of the present invention includes the following:

101. An encoder obtains data to be encoded.

In this embodiment, the encoder may obtain data to be encoded, where the data to be encoded is at least one LCU, that is, the data to be encoded may be an LCU or data composed of multiple LCUs.

102. The encoder determines a quantization depth parameter of the LCU according to a preset bit rate control algorithm, and writes the quantization depth parameter into the data to be encoded.

The encoder obtains a quantization depth parameter of the LCU according to a preset bit rate control algorithm, where the quantization depth parameter is used to indicate a size of a minimum picture block having an independent QP in the LCU.

It should be noted that the size described in this embodiment and the subsequent embodiments refers to a side length, for example, if a CU is 32*32, the size of the CU is defined as 32.

The encoder may obtain the quantization depth parameter of the LCU by attempting replacements, that is, constantly adjusting the value of the quantization depth parameter and performing analog encoding, so that the bit rate after the encoding complies with the expected requirement. The specific process is not limited herein.

After determining the quantization depth parameter, the encoder may write the quantization depth parameter into the data to be encoded for sending the data to the decoder.

103. The encoder determines a QP of each CU according to the size of the minimum picture block and a size of each CU included in the LCU.

After obtaining the quantization depth parameter of the LCU, the encoder may know the size of the minimum picture block having an independent QP and corresponding to the quantization depth parameter, and determines a QP of each CU according to the size of the minimum picture block and a size of each CU included in the LCU.

104. The encoder calculates a QP difference of each CU according to the QP of each CU and a QP prediction value of each CU.

In this embodiment, the encoder may obtain a QP prediction value of each CU by calculation according to the QP of each CU obtained in step 103, and then obtain a QP difference of each CU according to the QP prediction value and the QP.

In this embodiment, the QP difference of a CU may be defined as a difference between the QP of the CU and the QP prediction value of the CU.

105. For each CU that satisfies a preset condition, the encoder carries the QP difference of the CU in the CU.

After determining the QP difference of each CU, the encoder may select the CU that satisfies the preset condition from the CUs, and carry the QP difference of the CU in the CU that satisfies the preset condition.

106. The encoder encodes the quantization depth parameter, the QP difference of the CU that satisfies the preset condition, and each CU to obtain a bit stream.

In this embodiment, after the encoder writes the quantization depth parameter into the data to be encoded, and writes the QP difference into the CU that satisfies the preset condition, the encoder may encode the whole data to be encoded, that is, encode the quantization depth parameter, the QP difference of the CU that satisfies the preset condition, and each CU to obtain a bit stream.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP but the CU that satisfies the preset condition in the LCU corresponds to the QP. Therefore, the encoder can use the CU as the finest granularity for bit rate control. Because one LCU usually includes multiple CUs, the precision of bit rate control of the LCU can be effectively improved.

In addition, the encoder carries the QP difference of the CU only in the CU that satisfies the preset condition, but does not carry the QP difference in all CUs. Therefore, the encoding overhead may be decreased, and hence the overall compression efficiency is improved.

Figure 2:
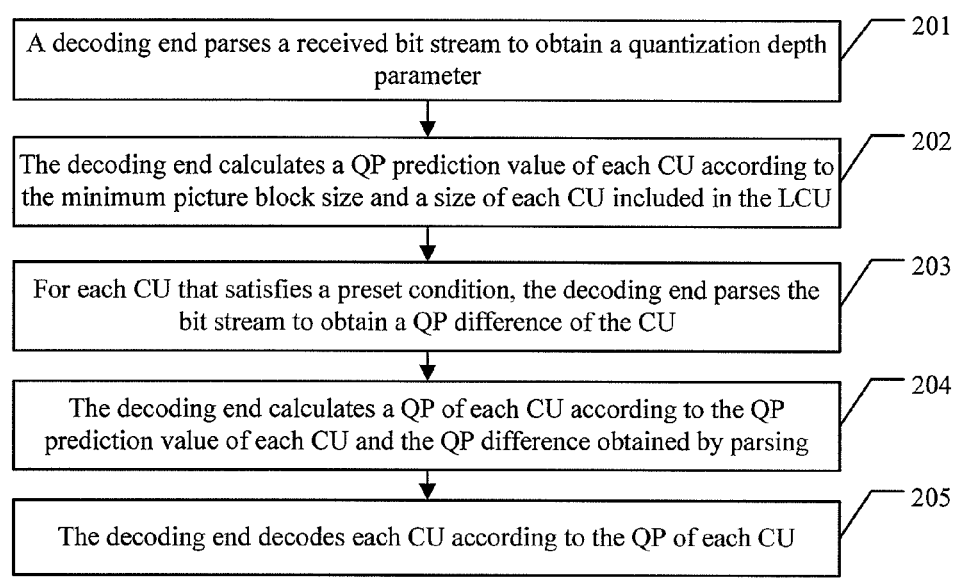
FIG. 2 is a schematic diagram of an embodiment of a decoding method according to the present invention.

The above describes the encoding process according to the present invention from the perspective of the encoder. The following describes a decoding process according to the present invention from the perspective of the decoder. Referring to FIG. 2, an embodiment of the decoding method according to the present invention includes:

201. A decoder parses a received bit stream to obtain a quantization depth parameter.

In this embodiment, the decoder may receive an encoded bit stream from the encoder. Because the encoder writes, during encoding, the quantization depth parameter into the data to be encoded, the decoder may parse the corresponding position of the bit stream to obtain the quantization depth parameter according to a pre-agreement.

The quantization depth parameter is used to indicate a size of a minimum picture block having an independent QP in the LCU.

202. The decoder calculates a QP prediction value of each CU according to the size of the minimum picture block and a size of each CU included in the LCU.

In this embodiment, after obtaining the quantization depth parameter by parsing from the bit stream, the decoder may know the size of the minimum picture block having an independent QP according to the quantization depth parameter, and determine a QP prediction value of each CU according to the size of the minimum picture block and a size of each CU included in the LCU.

203. For each CU that satisfies a preset condition, the decoder parses the bit stream to obtain a QP difference of the CU.

In this embodiment, the decoder may further parse, for each CU that satisfies a preset condition, the bit stream to obtain a QP difference of the CU.

It should be noted that the process of obtaining the QP difference by the decoder and the process of calculating the QP prediction value of each CU by the decoder are not limited in order; the process of obtaining the QP difference may be executed first, or the process of calculating the QP prediction value of each CU may be executed first, or the two processes may be executed simultaneously, which is not specifically limited herein.

204. The decoder calculates a QP of each CU according to the QP prediction value of each CU and the QP difference obtained by parsing.

After the decoder knows the QP prediction value of each CU through step 202 and obtains the QP difference by passing through step 203, the decoder may calculate the QP of each CU according to the parameters.

205. The decoder decodes each CU according to the QP of each CU.

In this embodiment, after knowing the QP of each CU, the decoder may perform inverse quantization processing and the subsequent decoding process for each CU, which is not specifically limited herein.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP. Therefore, the decoder may perform decoding for each CU during decoding without performing decoding for the whole LCU, and hence the decoding efficiency can be improved.

Figure 3:
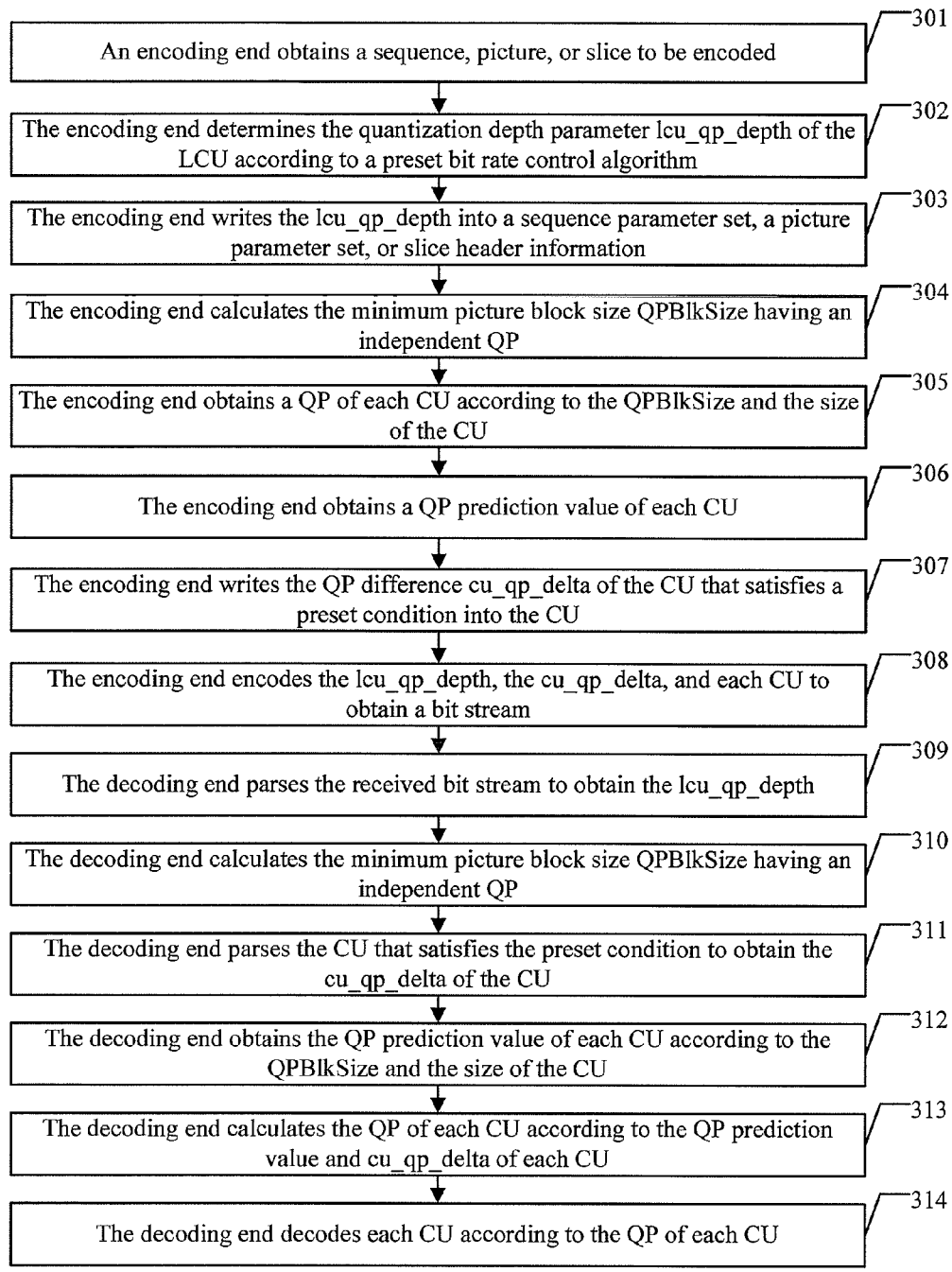
FIG. 3 is a schematic diagram of an embodiment of an encoding/decoding method according to the present invention.

For ease of understanding, the following description is provided from the perspective of encoding/decoding. Referring to FIG. 3, an embodiment of an encoding/decoding method according to the present invention includes the following:

301. An encoder obtains a sequence, picture, or slice to be encoded.

In this embodiment, the data to be encoded which is obtained by the encoder is a sequence, or a picture, or a slice.

It should be noted that: a sequence includes several pictures; a picture includes several slices; and a slice includes several LCUs.

That is, in this embodiment, the data to be encoded which is obtained by the encoder is multiple LCDs.

302. The encoder determines the quantization depth parameter lcu_qp_depth of the LCU according to a preset bit rate control algorithm.

The encoder obtains the corresponding value of the lcu_qp_depth according to a preset bit rate control algorithm. Specifically, the encoder may obtain the value of the lcu_qp_depth by attempting replacements, that is, constantly adjusting the value of the lcu_qp_depth and performing analog encoding, so that the bit rate after the encoding complies with the expected requirement. The specific process is not limited herein.

The value range of the lcu_qp_depth in this embodiment may be all integers from 0 to MaxSymbol, where MaxSymbol may be calculated by using the following method:

$$MaxSymbol=\log_2(max\_coding\_block\_size)-\log_2(min\_coding\_block\_size)$$

where, max_coding_block_size indicates a size of the maximum CU, namely, the size of an LCU, and min_coding_block_size indicates a size of the minimum CU.

It should be noted that the size described in this embodiment and the subsequent embodiments refers to a side length, for example, if a CU is 32*32, the size of the CU is defined as 32.

In this embodiment, the lcu_qp_depth is used to indicate a size of a minimum picture block having an independent QP in the LCU. When the lcu_qp_depth is 0, it indicates that the minimum picture block having an independent QP is the LCU; when the lcu_qp_depth is 1, it indicates that the LCU is divided into four 32*32 CUs, with the size of the minimum picture block being 32, and so on.

The lcu_qp_depth in this embodiment is a size of a minimum picture block having an independent QP in each LCU in the sequence, picture, or slice. That is, all LCUs in the sequence, picture, or slice use the same lcu_qp_depth.

303. The encoder writes the lcu_qp_depth into a sequence parameter set, a picture parameter set, or slice header information.

In this embodiment, after obtaining the value of the lcu_qp_depth, the encoder may write the lcu_qp_depth into the data to be encoded.

The encoder may write the lcu_qp_depth into a sequence parameter set of the sequence (SPS, Sequence Parameter Set), which may be specifically as follows:

```
seq_parameter_set_rbsp( ) {
    ...
    lcu_qp_depth
    ...
}
```

Or the encoder may write the lcu_qp_depth into the PPS of the picture, which may be specifically as follows:

```
Pic_parameter_set_rbsp( ) {
    ...
    lcu_qp_depth
    ...
}
```

Or the encoder may write the lcu_qp_depth into slice header information of the slice, which may be specifically as follows:

```
slice_header( ) {
    ...
    lcu_qp_depth
    ...
}
```

It is understandable that this embodiment uses only several examples to describe the position for writing the lcu_qp_depth; in an actual application, the lcu_qp_depth may also be written into other positions of the sequence, picture, or slice, which is not specifically limited herein.

304. The encoder calculates the size of the minimum picture block QPBlkSize having an independent QP.

After obtaining the lcu_qp_depth, the encoder may calculate the size QPBlkSize of the minimum picture block QPBlk according to the lcu_qp_depth.

Assuming that the size of the LCU is max_coding_block_size, the QPBlkSize may be obtained by calculation by using the following method:

$$QPBlkSize=max\_coding\_block\_size/(2^{lcu\_qp\_depth})$$

For example, when the max_coding_block_size is 64 and the lcu_qp_depth is 2, the QPBlkSize is 16, that is, the minimum picture block is a 16*16 CU.

305. The encoder obtains a QP of each CU according to the QPBlkSize and the size of the CU.

In this embodiment, the encoder may obtain the QP of each CU in the following situations.

The encoder calculates the QP of the CU whose size is greater than or equal to the QPBlkSize, according to the preset bit rate control algorithm.

For a CU whose size is smaller than the QPBlkSize, the encoder first determines a minimum picture block to which the CU belongs, then calculates a QP of the minimum picture block according to the preset bit rate control algorithm, and uses the QP of the minimum picture block as the QP of all CUs in the minimum picture block.

In this embodiment, the process of calculating the QP according to the preset bit rate control algorithm by the encoder is a common sense for a person skilled in the art, and is not specifically limited herein.

306. The encoder obtains a QP prediction value of each CU.

After obtaining the QP of each CU, the encoder may use, according to an encoding order (the encoding order and an decoding order are the same), QPs of the encoded CUs adjacent to each CU to obtain the QP prediction value of each CU. Typically, the adjacent encoded CUs include a left CU, an upper CU, and an upper left CU.

For ease of description, a reference CU is defined first:

The encoder uses each CU whose size is greater than or equal to the QPBlkSize as a reference CU, and for a CU whose size is smaller than the QPBlkSize, the encoder determines the minimum picture block to which the CU belongs, and uses the upper left CU of the minimum picture block as a reference CU.

Figure 4:
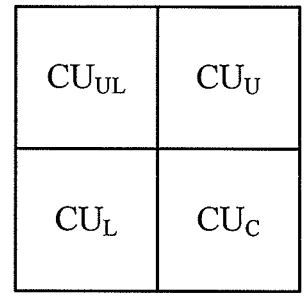
FIG. 4 is a schematic diagram showing a position relationship between a CU and adjacent CUs according to the present invention.

After the reference CU is defined, the encoder may calculate the QP prediction value of each reference CU according to the QPs of the CUs adjacent to each reference CU. There may be multiple specific calculation methods, which are described by using several examples:

1. Calculating by Using a Left CU, an Upper CU, and an Upper Left CU:

Referring to FIG. 4, the $CU_C$ is a reference CU, where the CU may be a CU whose size is greater than or equal to the QPBlkSize, or may be a CU at the upper left corner of the minimum picture block.

The $CU_U$ is an upper CU of the $CU_C$, the $CU_L$ is a left CU of the $CU_C$, and the $CU_{UL}$ is an upper left CU of the $CU_C$. In this embodiment, CUs adjacent to the $CU_C$ are a left CU, an upper CU, and an upper left CU.

The coordinates of the upper left pixel of the $CU_C$ are ($x_c$, $y_c$). Therefore, the $CU_L$ is a CU including the pixel ($x_c-1$, $y_c$), the $CU_U$ is a CU including the pixel ($x_c$, $y_c-1$), and the $CU_{UL}$ is a CU including the pixel ($x_c-1$, $y_c-1$).

After determining the CUs adjacent to the reference CU, the encoder may obtain QPs of the CUs according to the result calculated in step 305, where: the QP of the $CU_C$ is a $QP_C$, the QP of the $CU_U$ is a $QP_U$, the QP of the $CU_L$ is a $QP_L$, and the QP of the $CU_{UL}$ is a $QP_{UL}$.

It should be noted that not the left CU, upper CU, and upper left CU of every CU can be obtained. For example, the CU itself located at the leftmost side of the picture or slice does not have a left CU. Therefore, the encoder may determine the QP prediction value of each CU according to the following specific conditions:

(1) If none of the CUs adjacent to the $CU_C$ exists, determine the QP prediction value $QP_P$ of the $CU_C$ according to the slice and picture to which the $CU_C$ belongs.

Specifically, $QP_P$=slice_qp_delta+pic_init_qp_minus26+26, where slice_qp_delta is information included in the slice header information, and pic_init_qp_minus26 is information included in the picture parameter set.

(2) If only the $CU_L$ in the $CU_C$ exists, the $QP_L$ is used as a $QP_P$.

(3) If only the $CU_U$ in the $CU_C$ exists, the $QP_U$ is used as a $QP_P$.

(4) If all CUs adjacent to the $CU_C$ exist, obtain a first difference $|QP_L-QP_{UL}|$ between the $QP_L$ and the $QP_{UL}$, and a second difference $|QP_U-QP_{UL}|$ between the $QP_U$ and the $QP_{UL}$.

If $|QP_L-QP_{UL}|<|QP_U-QP_{UL}|$, it indicates that the difference between the $QP_L$ and the $QP_{UL}$ is smaller than the difference between the $QP_U$ and the $QP_{UL}$. In this case, it is quite possible that the $CU_L$ and $CU_{UL}$ belong to a same object in the picture. Because the edge of the object is located at the edge of the $CU_U$ and the $CU_{UL}$, the $QP_U$ may be used as a $QP_P$.

If $|QP_L-QP_{UL}|>=|QP_U-QP_{UL}|$, according to the above inference, the $QP_L$ may be used as a $QP_P$.

In an actual application, the following codes may be used to implement the above procedure:

```
if((QP_L exists) && (QP_UL exists) && (QP_U exists) &&
(|QP_L - QP_UL| < |QP_U - QP_UL|))
    QP_P =QP_U;
else if ((QP_L exists) && (QP_UL exists) && (QP_U exists) &&|QP_L
- QP_UL| > |QP_U - QP_UL|))
    QP_P = QP_L;
else if (QP_L exists)
    QP_P = QP_L;
else if (QP_U exists)
    QP_P = QP_U;
else
    QP_P = slice_qp_delta + pic_init_qp_minus26 + 26
```

It is understandable that the above codes are only an example in the implementation process; in an actual application, other similar codes may be used for implementation, where the specific implementation is not limited herein.

2. Calculating by Using a Left CU, an Upper CU, and a Previous Encoded CU:

Also referring to FIG. 4, in this embodiment, the $CU_L$ and the $CU_U$ may be used as CUs adjacent to a reference $CU_C$, where the $CU_C$ may be a CU whose size is greater than or equal to the QPBlkSize, or may be a CU at the upper left corner of the minimum picture block.

The coordinates of the upper left pixel of the $CU_C$ are ($x_c$, $y_c$). Therefore, the $CU_L$ is a CU including the pixel ($x_c-1$, $y_c$), the $CU_U$ is a CU including the pixel ($x_c$, $y_c-1$), the QP of the $CU_C$ is a $QP_L$, the QP of the $CU_U$ is a $QP_U$, and the QP of the $CU_L$ is a $QP_L$.

It should be noted that not the left CU and upper CU of every CU can be obtained. For example, the CU itself located at the leftmost side of the picture or slice does not have a left CU. Therefore, the encoder may determine the QP prediction value of each CU according to the following specific conditions:

(1) If the $CU_L$ of the $CU_C$ exists, the $QP_L$ is used as a $QP_P$.

(2) If the $CU_L$ of the $CU_C$ does not exist, and the $CU_U$ of the $CU_C$ or the previous encoded CU of the $CU_C$ exists, the $QP_U$ or the QP of the previous encoded CU is used as a $QP_P$.

(3) If the $CU_L$ of the $CU_C$ does not exist, and both the $CU_U$ of the $CU_C$ and the previous encoded CU of the $CU_C$ exist, the $QP_U$ or the QP of the previous encoded CU is used as a $QP_P$. Specifically, whether to use the $QP_U$ or the QP of the previous encoded CU as the $QP_P$ may be specified beforehand at the encoder/decoder.

(4) If none of the $CU_L$, the $CU_U$, and the previous encoded CU of the $CU_C$ exists, a $QP_P$ is determined according to the slice and picture to which the $CU_C$ belongs to:

Specifically, $QP_P$=slice_qp_delta+pic_init_qp_minus26+26, where slice_qp_delta is information included in the slice header information, and pic_init_qp_minus26 is information included in the picture parameter set.

The above only uses two examples to describe the process of calculating the QP prediction value of each reference CU by the encoder. It is understandable that in an actual application, the encoder may further use more methods to calculate the QP prediction value of each reference CU, which is not specifically limited herein.

307. The encoder writes the QP difference cu_qp_delta of the CU that satisfies a preset condition into the CU.

The encoder obtains the QP of each CU by calculation through step 305, and obtains the QP prediction value of each reference CU by calculation through step 306. Therefore, the encoder may further calculate the QP difference cu_qp_delta of each CU according to the parameters, and the specific calculation method may be as follows:

For each reference CU, the encoder uses the difference between the QP of the reference CU and the QP prediction value of the reference CU as the QP difference of the reference CU, that is, cu_qp_delta=$QP_C$-$QP_P$.

If other CU is included in the minimum picture block to which the reference CU belongs, the encoder uses the QP difference of the reference CU as the QP difference of the other CUs in the minimum picture block.

That is, for a CU whose size is greater than or equal to the QPBlkSi, because such CUs are reference CUs, the encoder may use the difference between the QPs and QP prediction values of the CUs as the cu_qp_delta of the CUs.

For CUs whose size is smaller than the QPBlkSize, that is, several CUs are included in the minimum picture block, where the CU at the upper left corner of the minimum picture block is a reference CU, the QP prediction value of the reference CU may be obtained through step 306. Then cu_qp_delta=$QP_C$-$QP_P$ of the reference CU may be obtained in combination with the QP calculated in step 305, and afterward, the cu_qp_delta value of the reference CU is assigned to other CUs in the minimum picture block. It should be noted that in an actual application, in addition to the value assignment operation, other methods may be used for processing, for example, if it is determined that a CU in the minimum picture block satisfies a preset condition, the cu_qp_delta of the reference CU of the minimum picture block to which the CU belongs is carried in the CU.

In this embodiment, after obtaining the cu_qp_delta of each CU, the encoder may carry the cu_qp_delta of the CU in the CU that satisfies the preset condition. The specific CU that satisfies the preset condition may be a CU having a non-zero quantized transform coefficient in the compressed bit stream of the CU.

If a CU uses a skip encoding mode, no non-zero quantized transform coefficient exists in the compressed bit stream of the CU. Therefore, such CUs do not satisfy the preset condition; if the skip encoding mode is not used, the CUs may include a non-zero quantized transform coefficient in the compressed bit streams of the CUs, and the CUs satisfy the preset condition.

In this embodiment, for a CU that satisfies the preset condition, the encoder may write the cu_qp_delta of the CU into the following position of the CU:

```
Coding_unit( x0, y0, log2CUSize ) {
    if( slice_type != I )
        Skip_flag[ x0 ][ y0 ]
    if( skip_flag[ x0 ][ y0 ] )
        prediction_unit( x0, y0, log2CUSize, log2CUSize )
    else {
        ...
        Prediction_unit( x0, y0, log2CUSize, log2CUSize )
        Transform_tree( x0, y0, log2CUSize, 0, 0 ){
            ...
            if (sig_coeff_num > 0) {
                cu_qp_delta
                transform_coeff( x0, y0, log2TrafoSize, trafoDepth,
    cIdx )
            }
            ...
        }
        ...
    }
}
``` where: sig_coeff_num>0 is a condition for judging whether the cu_qp_delta exists in the bit stream of the current CU; if the judging condition is true, it indicates that the cu_qp_delta exists in the bit stream of the current CU; or if the judging condition is false, it indicates that the cu_qp_delta does not exist in the bit stream of the current CU.

It should be noted that for a CU whose size is smaller than the QPBlkSize, the encoder judges whether the CUs in the minimum picture block to which the CU belongs satisfy the preset condition; if one CU does not satisfy the preset condition, continues to judge whether the subsequent CUs satisfy the preset condition; if a subsequent CU satisfies the preset condition, writes the cu_qp_delta of the CU into the CU and stops judgment, that is, the cu_qp_delta is not written into other CUs in the minimum picture block any longer no matter whether the CUs satisfy the preset condition or not.

It should be noted that because not all CUs satisfy the preset condition, the encoder not only may carry, in the CU that satisfies the preset condition, the cu_qp_delta of the CU, but also may reset the QP for the CU that does not satisfy the preset condition. The specific method may be as follows:

For each CU that does not satisfy the preset condition, the encoder sets the QP of the CU in the following manner:

for a CU whose size is greater than or equal to the QPBlkSize, the encoder uses the QP prediction value of the CU as the QP of the CU; and for a CU whose size is smaller than the QPBlkSize, if none of other CUs in the minimum picture block to which the CU belongs satisfies the preset condition, the encoder uses the QP prediction value of a reference CU in the minimum picture block to which the CU belongs as the QP of the CU.

Resetting the QP of the CU that does not satisfy the preset condition may ensure that the prediction value same as that of the decoder can be obtained during QP prediction in the subsequent encoded CU.

308. The encoder encodes the lcu_qp_depth, the cu_qp_delta, and each CU to obtain a bit stream.

After obtaining the lcu_qp_depth and the cu_qp_delta, the encoder may encode each CU. In this embodiment, the process of encoding the lcu_qp_depth by the encoder may include: using, by the encoder, a fixed-length code or a variable-length code to perform a binary transform for the lcu_qp_depth to obtain a corresponding binary code word; and writing, by the encoder according to a method of fixed-length encoding, variable-length encoding, or arithmetic entropy encoding, the obtained binary code word into the bit stream corresponding to the position determined in step 302.

The variable-length code used by the encoder may be an unsigned Exponential-Golomb code, or other similar variable-length codes, and is not specifically limited herein.

The process of encoding the cu_qp_delta by the encoder may include:

using, by the encoder, a variable-length code to perform a binary transform for the cu_qp_delta of the CU that satisfies the preset condition to obtain a corresponding binary code word; and writing, by the encoder, the obtained binary code word into the bit stream according to a method of variable-length encoding or arithmetic entropy encoding.

The encoder writes, according to a method of fixed-length encoding, variable-length encoding, or arithmetic entropy encoding, the obtained binary code word into the bit stream corresponding to the position determined in step 307.

The variable-length code used by the encoder may be a signed Exponential-Golomb code, or other similar variable-length codes, and is not specifically limited herein.

In this embodiment, the process of encoding the CU by the encoder is not limited herein. Upon completion of encoding, the bit stream is obtained, and the encoder may send the bit stream to the decoder.

309. The decoder decodes the received bit stream to obtain the lcu_qp_depth.

After receiving the bit stream, the decoder may know, according to the pre-agreement with the encoder, that the position of the lcu_qp_depth in the bit stream is an SPS, a PPS, or an SH, and hence obtains a binary code word from the position by using a method of fixed-length decoding, variable-length decoding, or arithmetic entropy decoding.

The decoder uses a fixed-length code or a variable-length code to perform an inverse binary transform for the binary code word to obtain the lcu_qp_depth.

The variable-length code in this embodiment may be an unsigned Exponential-Golomb code, or other similar variable-length codes, and is not specifically limited herein.

The lcu_qp_depth in this embodiment is used to indicate a size of a minimum picture block having an independent QP in each LCU in the sequence, or picture, or slice.

310. The decoder calculates the size of the minimum picture block QPBlkSize having an independent QP.

After obtaining the lcu_qp_depth by calculation, the decoder may obtain the QPBlkSize by calculation according to the lcu_qp_depth. The specific calculation method may be the same as the method for calculating the QPBlkSize by the encoder in step 304, and is not further described herein.

311. The decoder parses the CU that satisfies the preset condition to obtain the cu_qp_delta of the CU.

In this embodiment, for each CU that satisfies the preset condition, the decoder may obtain a binary code word from the corresponding position in the bit stream of the CU by using a method of variable-length decoding or arithmetic entropy decoding.

The decoder uses a variable-length code to perform an inverse binary transform for the binary code word to obtain the cu_qp_delta of the CU.

The variable-length code in this embodiment may be a signed Exponential-Golomb code, or other similar variable-length codes, and is not specifically limited herein.

It should be noted that according to the description in step 307, sig_coeff_num>0 is a condition for judging whether the cu_qp_delta exists in the bit stream of the current CU; therefore, the decoder may know, by checking the judging condition, whether the CU satisfies the preset condition; and the CU that satisfies the preset condition may also be a CU having a non-zero quantized transform coefficient in the compressed bit stream of the CU.

In this embodiment, because not all CUs are CUs that satisfy the preset condition, the decoder may determine the cu_qp_delta of all CUs in the following manner:

For each CU whose size is greater than or equal to the QPBlkSize, the decoder judges whether the CU satisfies the preset condition, and if the CU satisfies the preset condition, parses the CU to obtain the cu_qp_delta of the CU, or if the CU does not satisfy the preset condition, sets the cu_qp_delta of the CU to 0; and for a CU whose size is smaller than the QPBlkSize, the decoder determines the minimum picture block to which the CU belongs, and judges, in turn according to the decoding order of CUs in the minimum picture block, whether each CU in the minimum picture block satisfies the preset condition, and if so, stops judgment, and uses the cu_qp_delta of the CU as the cu_qp_delta of all the CUs in the minimum picture block, or if none of the CUs in the minimum picture block satisfies the preset condition, sets the cu_qp_delta of all the CUs in the minimum picture block to 0.

312. The decoder obtains the QP prediction value of each CU according to the QPBlkSize and the size of the CU.

After obtaining the QPBlkSize, the decoder may obtain the QP prediction value of each CU according to the size of each CU and the QPBlkSize.

The specific process in this step is the same as the method for obtaining the QP prediction value of each CU by the encoder in step 306. As described in step 306, the adjacent area is an encoded or decoded area. Because the encoding order is the same as the decoding order, the encoded area and the decoded area are the same area. Because the QPs of CUs in the adjacent area may be obtained, the QP prediction value of each CU may be obtained according to the method same as in step 306.

After the QP prediction value of each CU is obtained, the QP of the CU may be obtained in combination with the cu_qp_delta of each CU obtained in step 311, that is, QP=QP prediction value+cu_qp_delta.

313. The decoder calculates the QP of each CU according to the QP prediction value and cu_qp_delta of each CU.

After obtaining the QP prediction value of each CU by calculation, the decoder may calculate the QP of each CU according to the QP prediction value and cu_qp_delta of each CU. The specific method may be:

for a CU that does not satisfy the preset condition and whose size is greater than or equal to the QPBlkSize, using, by the decoder, the QP prediction value of the CU as the QP of the CU;

for a CU that satisfies the preset condition and whose size is greater than or equal to the QPBlkSize, using, by the decoder, a sum of the QP prediction value of the CU and the cu_qp_delta of the CU as the QP of the CU;

for a CU whose size is smaller than the QPBlkSize, if the CU satisfies the preset condition, obtaining, by the decoder, the QP prediction value of the upper left CU of the minimum picture block to which the CU belongs, and using a sum of the QP prediction value and the cu_qp_delta as the QP of the CU, and using the QP of the CU as the QP of all the CUs in the minimum picture block; and for a CU whose size is smaller than the QPBlkSize, if none of the CUs in the minimum picture block to which the CU belongs satisfies the preset condition, obtaining, by the decoder, the QP prediction value of the upper left CU of the minimum picture block to which the CU belongs, and using the QP prediction value as the QP of all the CUs in the minimum picture block.

314. The decoder decodes each CU according to the QP of each CU.

In this embodiment, the decoder may perform inverse quantization processing and the subsequent decoding process for each CU by using the QP of each CU obtained in step 313, which is not specifically limited herein.

Figure 5:
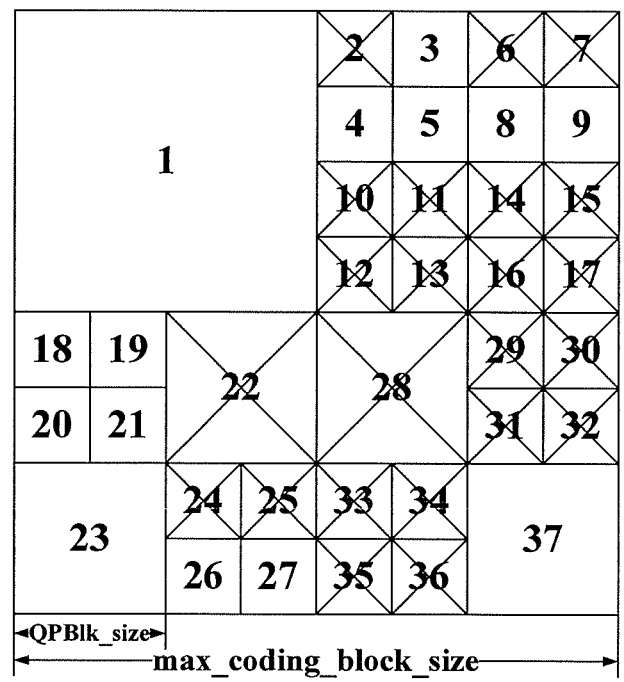
FIG. 5 is a schematic structural diagram of an LCU according to the present invention.

For ease of understanding, the following uses a specific instance to briefly describe an encoding/decoding method according to the present invention. Reference is made to FIG. 5, which is a schematic structural diagram of an LCU according to the present invention, where the max_coding_block_size is 64, and the QPBlkSize is 16.

As seen from FIG. 5, the LCU includes 37 CUs, where the CU marked with a cross is a CU using skip encoding, namely, a CU that does not satisfy the preset condition. In the remaining CUs, assuming that the quantized transform coefficients which are included in the compressed bit streams of a CU3 and a CU23 are both 0, the CU3 and CU23 are also CUs that do not satisfy the preset condition, and the remaining CUs are CUs that satisfy the preset condition.

Figure 6:
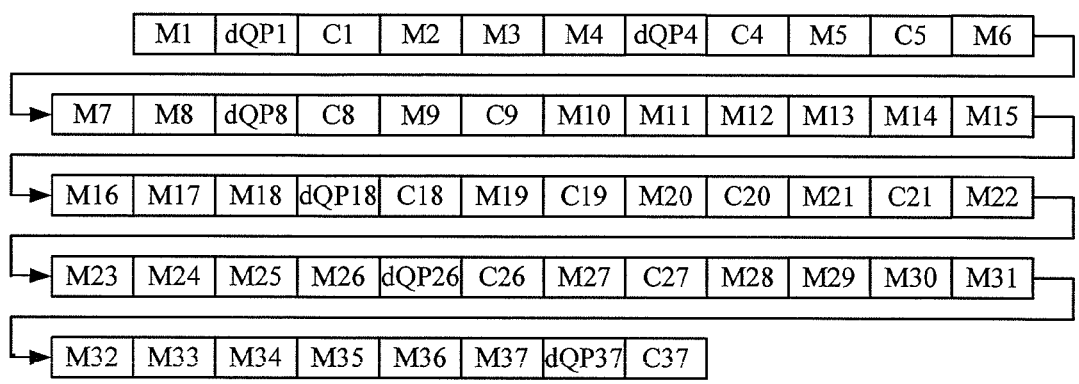
FIG. 6 is a schematic structural diagram of an encoded bit stream according to the present invention.

According to the encoding process described in the embodiment in FIG. 3, the structure of a bit stream obtained after encoding of the LCU in FIG. 5 is shown in FIG. 6, where M1, M2, . . . , and M37 are header information, C1, C4, . . . , and C37 are transform coefficients, and DQP1, DQP4, . . . , and DQP37 are cu_qp_delta.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP but the CU that satisfies the preset condition in the LCU corresponds to the QP. Therefore, the encoder can use the CU as the finest granularity for bit rate control. Because one LCU usually includes multiple CUs, the precision of bit rate control of the LCU can be effectively improved.

Secondly, the encoder carries the QP difference of the CU only in the CU that satisfies the preset condition, but does not carry the QP difference in all CUs. Therefore, the encoding overhead may be decreased, and hence the overall compression efficiency is improved.

Thirdly, in this embodiment, the encoder and the decoder may use multiple prediction methods to calculate the QP prediction value of the CU so that the calculation process is more flexible and can adapt to multiple different environments.

The above describes an encoding/decoding method. The following describes another encoding/decoding method. Specifically referring to FIG. 7, another embodiment of the encoding/decoding method according to the present invention includes the following:

701. An encoder obtains an LCU to be encoded.

In this embodiment, the data to be encoded which is obtained by the encoder is one LCU.

702. The encoder determines the quantization depth parameter lcu_qp_depth of the LCU according to a preset bit rate control algorithm.

The encoder obtains the corresponding value of the lcu_qp_depth according to a preset bit rate control algorithm. Specifically, the encoder may obtain the value of the lcu_qp_depth by attempting replacements, that is, constantly adjusting the value of the lcu_qp_depth and performing analog encoding, so that the bit rate after the encoding complies with the expected requirement. The specific process is not limited herein.

The value range of the lcu_qp_depth in this embodiment may be all integers from 0 to MaxSymbol, where MaxSymbol may be calculated by using the following method:

MaxSymbol=log$_2$(max_coding_block_size)−log$_2$(min_coding_block_size);

where, max_coding_block_size indicates a size of the maximum CU, namely, the size of an LCU, and min_coding_block_size indicates a size of the minimum CU.

It should be noted that the size described in this embodiment and the subsequent embodiments refers to a side length, for example, if a CU is 32*32, the size of the CU is defined as 32.

In this embodiment, the lcu_qp_depth is used to indicate a size of a minimum picture block having an independent QP in the LCU. When the lcu_qp_depth is 0, it indicates that the minimum picture block having an independent QP is the LCU; when the lcu_qp_depth is 1, it indicates that the LCU is divided into four 32*32 CUs, with the size of the minimum picture block being 32, and so on.

The lcu_qp_depth in this embodiment is a size of a minimum picture block having an independent QP in a current LCU, that is, the lcu_qp_depth used by each LCU in the sequence, picture, or slice is independent, and the lcu_qp_depth used by each LCU may be different.

703. The encoder writes the lcu_qp_depth into a first CU having a non-zero quantized transform coefficient in a compressed bit stream of the CU in the current LCU according to an encoding order.

In this embodiment, after obtaining the lcu_qp_depth value, the encoder may write the lcu_qp_depth into a first CU having a non-zero quantized transform coefficient in a compressed bit stream of the CU in the current LCU according to the encoding order:

```
slice_data( ) {
  CurrTbAddr = first_tb_in_slice
  moreDataFlag = 1
  do {
    xCU = HorLumaLocation( CurrTbAddr )
    yCU = VerLumaLocation( CurrTbAddr )
    lcu_qp_depthFlag = 1
    coding_tree( xCU, yCU, Log2TbSize ){
      ...
      coding_unit( x0, y0, log2CUSize ) {
        if( slice_type != I )
          skip_flag[ x0 ][ y0 ]
        if(!skip_flag[ x0 ][ y0 ] && lcu_qp_depthFlag){
          if (sig_coeff_num > 0) {
            lcu_qp_depth
            lcu_qp_depthFlag = 0
          }
          ...
        }
      }
    }
    ...
  }
  ...
  } while( moreDataFlag )
}
``` where, the lcu_qp_depthFlag variable is introduced to reach the purpose of transmitting the lcu_qp_depth in only the first CU having a non-zero quantized transform coefficient in a compressed bit stream of the CU. Of course, other methods may also be used to implement the same bit stream structure.

In this embodiment, sig_coeff_num>0 is a condition for judging whether the lcu_qp_depth exists in the bit stream of the current CU. When the judging condition is satisfied, the lcu_qp_depth may also be placed in other positions of the bit stream of the current CU, which is not specifically limited herein.

Because not every CU satisfies the condition for carrying the lcu_qp_depth, in this embodiment, the encoder checks, according to the encoding order of the CU, whether every CU satisfies the condition for carrying the lcu_qp_depth, that is, whether the CU is a first CU having a non-zero quantized transform coefficient in a compressed bit stream of the CU.

If the current CU does not satisfy the condition for carrying the lcu_qp_depth, the encoder continues to check the subsequent CUs in the current LCU. In a CU, if it is found that the CU satisfies the condition for carrying the lcu_qp_depth, the lcu_qp_depth is written into the CU in the position specified above.

In this embodiment, after writing the lcu_qp_depth into a CU, the encoder does not need to write the lcu_qp_depth again into other CUs of the LCU to which the CU belongs.

Steps 704-708 are the same as steps 304-308 shown in FIG. 3, and are not further described herein.

709. The decoder decodes the received bit stream to obtain the lcu_qp_depth.

After receiving the bit stream, the decoder may know, according to the pre-agreement with the encoder, the position of the lcu_qp_depth in the bit stream, and hence obtains a binary code word from the position by using a method of fixed-length decoding, variable-length decoding, or arithmetic entropy decoding.

The decoder uses a fixed-length code or a variable-length code to perform an inverse binary transform for the binary code word to obtain the lcu_qp_depth.

The variable-length code in this embodiment may be an unsigned Exponential-Golomb code, or other similar variable-length codes, and is not specifically limited herein.

The lcu_qp_depth in this embodiment is used to indicate a size of a minimum picture block having an independent QP in the current LCU.

Steps 710-714 are the same as steps 310-314 described in the embodiment shown in FIG. 3, and are not further described herein.

For ease of understanding, the following uses a specific instance to briefly describe an encoding/decoding method according to the present invention. Reference is also made to FIG. 5, which is a schematic structural diagram of an LCU according to the present invention, where the max_coding_block_size is 64, and the QPBlkSize is 16.

As seen from FIG. 5, the LCU includes 37 CUs, where the CU marked with a cross is a CU using skip encoding, namely, a CU that does not satisfy the preset condition. In the remaining CUs, assuming that the quantized transform coefficients that are included in the compressed bit streams of a CU3 and a CU23 are both 0, the CU3 and CU23 are also CUs that do not satisfy the preset condition, and the remaining CUs are CUs that satisfy the preset condition.

Figure 7:
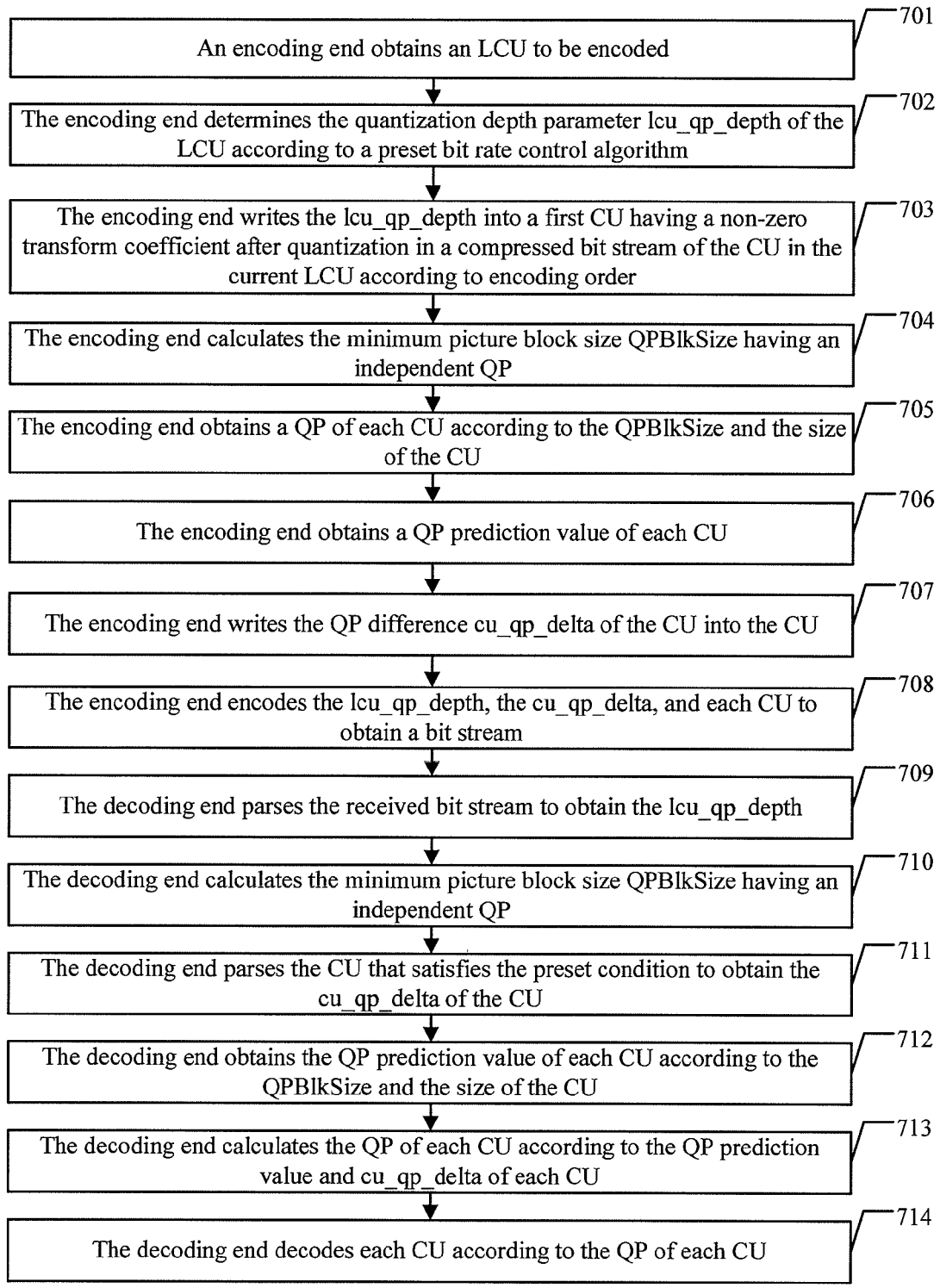
FIG. 7 is a schematic diagram of another embodiment of an encoding/decoding method according to the present invention.
Figure 8:
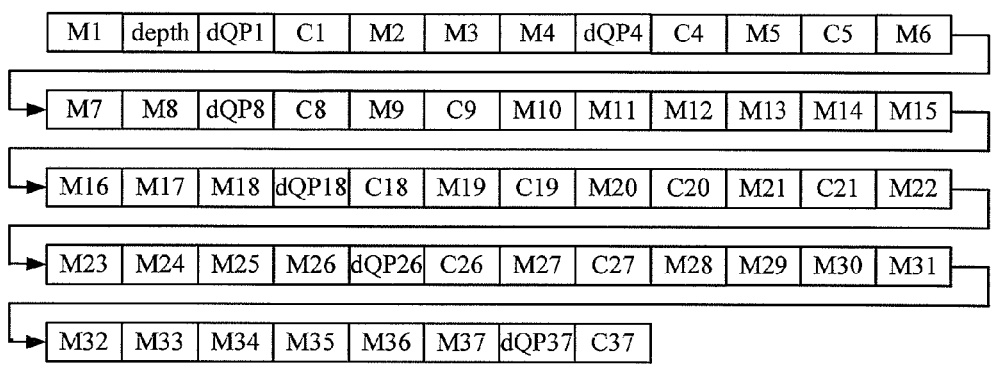
FIG. 8 is a schematic structural diagram of another encoded bit stream according to the present invention.

According to the encoding process described in the embodiment in FIG. 7, the structure of a bit stream obtained after encoding of the LCU in FIG. 5 is shown in FIG. 8, where the depth is the lcu_qp_depth, M1, M2, ..., and M37 are header information, C1, C4, ..., and C37 are transform coefficients, and DQP1, DQP4, ..., and DQP37 are cu_qp_delta.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP but the CU that satisfies the preset condition in the LCU corresponds to the QP. Therefore, the encoder can use the CU as the finest granularity for bit rate control. Because one LCU usually includes multiple CUs, the precision of bit rate control of the LCU can be effectively improved.

Secondly, the encoder carries the QP difference of the CU only in the CU that satisfies the preset condition, but does not carry the QP difference in all CUs. Therefore, the encoding overhead may be decreased, and hence the overall compression efficiency is improved.

Thirdly, in this embodiment, the encoder and the decoder may use multiple prediction methods to calculate the QP prediction value of the CU so that the calculation process is more flexible and can adapt to multiple different environments.

Further, in this embodiment, the lcu_qp_depth is used to indicate a size of a minimum picture block having an independent QP in the current LCU. Therefore, each LCU carries one piece of lcu_qp_depth, so that different LCUs may use different lcu_qp_depth, thereby further improving the precision of bit rate control of the LCU.

Figure 9:
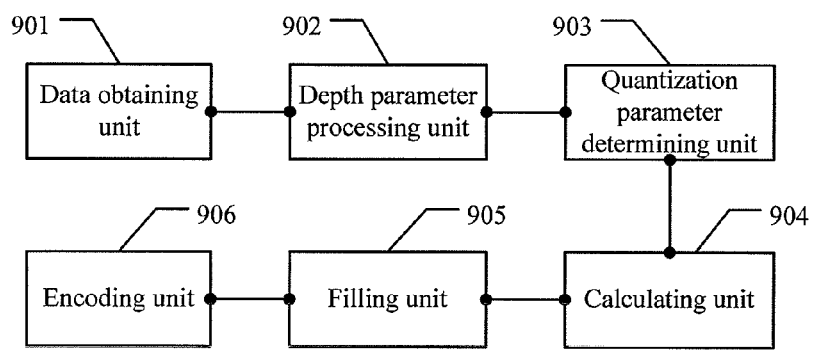
FIG. 9 is a schematic diagram of an embodiment of an encoding device according to the present invention.

The following describes an embodiment of an encoding device according to the present invention. Referring to FIG. 9, an embodiment of the encoding device according to the present invention includes:

a data obtaining unit 901, configured to obtain data to be encoded, where the data to be encoded is at least one largest coding unit LCU;

a depth parameter processing unit 902, configured to determine a quantization depth parameter of the LCU according to a preset bit rate control algorithm, and write the quantization depth parameter into the data to be encoded which is obtained by the data obtaining unit 901, where the quantization depth parameter is used to indicate a size of a minimum picture block having an independent QP in the LCU;

a quantization parameter determining unit 903, configured to determine a QP of each CU according to the size of the minimum picture block and a size of each CU included in the LCU;

a calculating unit 904, configured to calculate a QP difference of each CU according to the QP of each CU determined by the quantization parameter determining unit 903 and a QP prediction value of each CU;

a filling unit 905, configured to carry, for each CU that satisfies a preset condition, the QP difference of the CU in the CU; and an encoding unit 906, configured to encode the quantization depth parameter, the QP difference of the CU that satisfies the preset condition, and each CU to obtain a bit stream.

Figure 10:
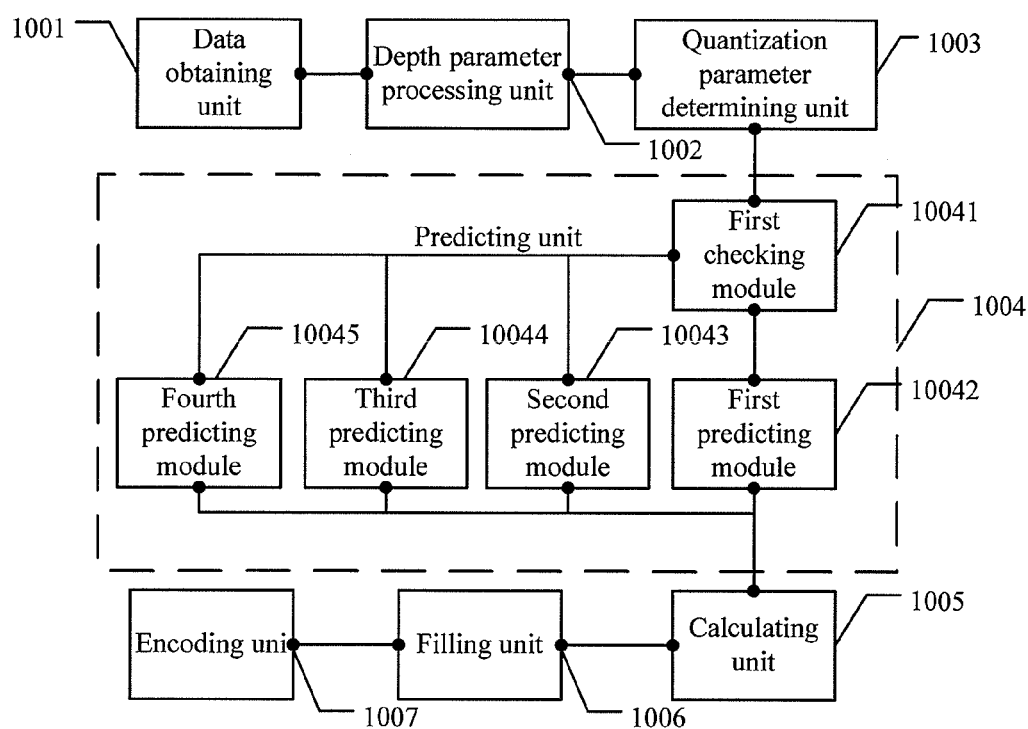
FIG. 10 is a schematic diagram of another embodiment of an encoding device according to the present invention.

For ease of understanding, the following describes an encoding device according to the present invention in detail. Referring to FIG. 10, another embodiment of the encoding device according to the present invention includes:

a data obtaining unit 1001, configured to obtain data to be encoded, where the data to be encoded is at least one largest coding unit LCU;

a depth parameter processing unit 1002, configured to determine a quantization depth parameter of the LCU according to a preset bit rate control algorithm, and write the quantization depth parameter into the data to be encoded which is obtained by the data obtaining unit 1001, where the quantization depth parameter is used to indicate a size of a minimum picture block having an independent QP in the LCU;

a quantization parameter determining unit 1003, configured to determine a QP of each CU according to the size of the minimum picture block and a size of each CU included in the LCU;

a calculating unit 1005, configured to calculate a QP difference of each CU according to the QP of each CU determined by the quantization parameter determining unit 1003 and a QP prediction value of each CU;

a filling unit 1006, configured to carry, for each CU that satisfies a preset condition, the QP difference of the CU in the CU; and an encoding unit 1007, configured to encode the quantization depth parameter, the QP difference of the CU that satisfies the preset condition, and each CU to obtain a bit stream.

The encoding device in this embodiment may further include:

a predicting unit 1004, configured to calculate the QP prediction value of each reference CU according to QPs of CUs adjacent to each reference CU;

where, each CU whose size is greater than or equal to the size of the minimum picture block is used as a reference CU, and for a CU whose size is smaller than the size of the minimum picture block, an upper left CU of a minimum picture block to which the CU belongs is used as a reference CU.

The predicting unit 1004 in this embodiment includes:

a first checking module 10041, configured to judge, for each reference CU, whether CUs adjacent to the reference CU exist, where the CUs adjacent to the reference CU include a left CU, an upper CU, and an upper left CU of the reference CU;

a first predicting module 10042, configured to determine, when none of the CUs adjacent to the reference CU exists, the QP prediction value of the reference CU according to a slice or picture to which the reference CU belongs;

a second predicting module 10043, configured to use, when only the left CU of the reference CU exists, the QP of the left CU as the QP prediction value of the reference CU;

a third predicting module 10044, configured to use, when only the upper CU of the reference CU exists, the QP of the upper CU as the QP prediction value of the reference CU; and a fourth predicting module 10045, configured to obtain a first difference between the QP of the left CU and the QP of the upper left CU and a second difference between the QP of the upper CU and the QP of the upper left CU when all the CUs adjacent to the reference CU exist, and use the QP of the upper CU as the QP prediction value of the reference CU if the first difference is smaller than the second difference, or use the QP of the left CU as the QP prediction value of the reference CU if the first difference is greater than or equal to the second difference.

Figure 11:
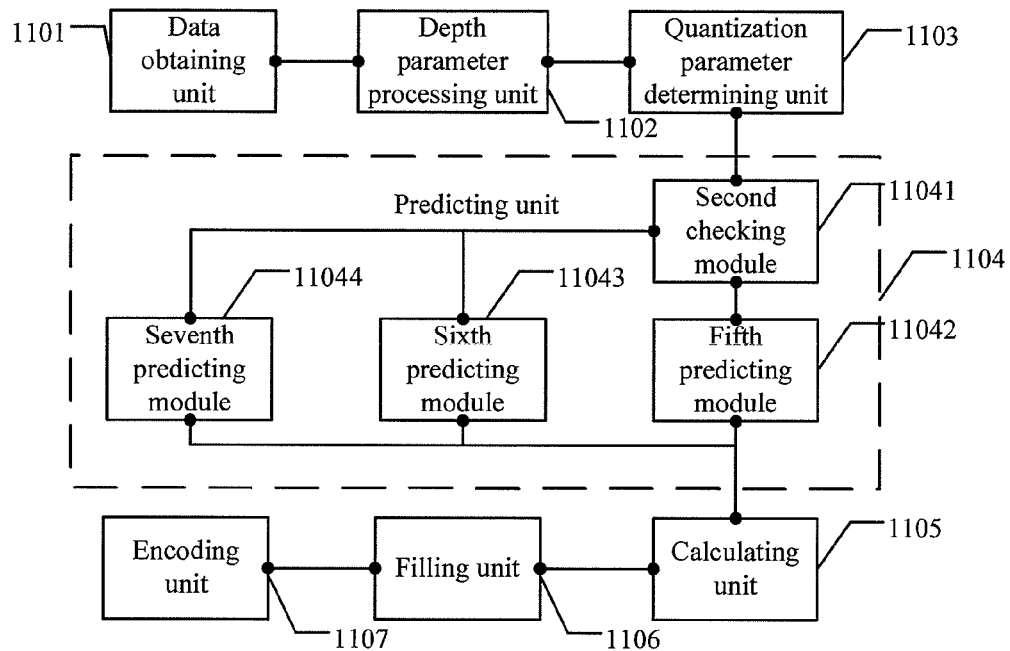
FIG. 11 is a schematic diagram of another embodiment of an encoding device according to the present invention.

Referring to FIG. 11, another embodiment of the encoding device according to the present invention includes:

a data obtaining unit 1101, configured to obtain data to be encoded, where the data to be encoded is at least one largest coding unit LCU;

a depth parameter processing unit 1102, configured to determine a quantization depth parameter of the LCU according to a preset bit rate control algorithm, and write the quantization depth parameter into the data to be encoded which is obtained by the data obtaining unit 1101, where the quantization depth parameter is used to indicate a size of a minimum picture block having an independent QP in the LCU;

a quantization parameter determining unit 1103, configured to determine a QP of each CU according to the size of the minimum picture block and a size of each CU included in the LCU;

a calculating unit 1105, configured to calculate a QP difference of each CU according to the QP of each CU determined by the quantization parameter determining unit 1103 and a QP prediction value of each CU;

a filling unit 1106, configured to carry, for each CU that satisfies a preset condition, the QP difference of the CU in the CU; and an encoding unit 1107, configured to encode the quantization depth parameter, the QP difference of the CU that satisfies the preset condition, and each CU to obtain a bit stream.

The encoding device in this embodiment may further include:

a predicting unit 1104, configured to calculate the QP prediction value of each reference CU according to QPs of CUs adjacent to each reference CU;

where, each CU whose size is greater than or equal to the size of the minimum picture block is used as a reference CU, and for a CU whose size is smaller than the size of the minimum picture block, an upper left CU of a minimum picture block to which the CU belongs is used as a reference CU.

The predicting unit 1004 in this embodiment includes:

a second checking module 11041, configured to judge, for each reference CU, whether a left CU of the reference CU exists;

a fifth predicting module 11042, configured to use, when the left CU of the reference CU exists, the QP of the left CU as the QP prediction value of the reference CU;

a sixth predicting module 11043, configured to use, when the left CU of the reference CU does not exist, and an upper CU of the reference CU or a previous encoded CU of the reference CU exists, the QP of the upper CU or the QP of the previous encoded CU as the QP prediction value of the reference CU; and a seventh predicting module 11044, configured to determine, when none of the left CU, the upper CU, and the previous encoded CU of the reference CU exists, the QP prediction value of the reference CU according to a slice or picture to which the reference CU belongs.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP but the CU that satisfies the preset condition in the LCU corresponds to the QP. Therefore, the encoder can use the CU as the finest granularity for bit rate control. Because one LCU usually includes multiple CUs, the precision of bit rate control of the LCU can be effectively improved.

Secondly, the encoder carries the QP difference of the CU only in the CU that satisfies the preset condition, but does not carry the QP difference in all CUs. Therefore, the encoding overhead may be decreased, and hence the overall compression efficiency is improved.

Figure 12:
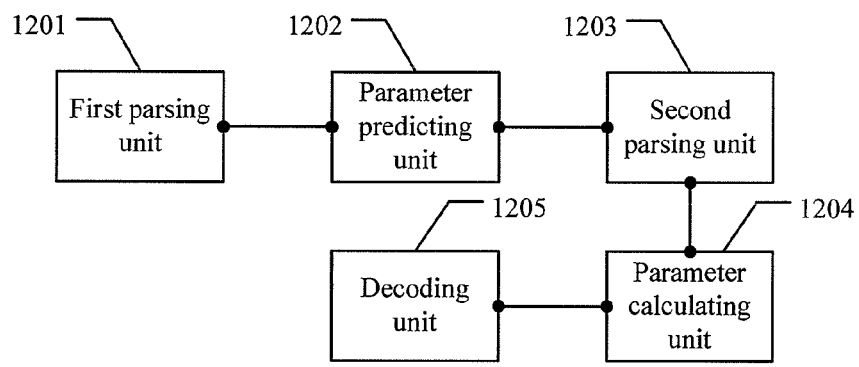
FIG. 12 is a schematic diagram of an embodiment of a decoding device according to the present invention.

The following describes an embodiment of an encoding device according to the present invention. Referring to FIG. 12, an embodiment of the decoding device according to the present invention includes:

a first parsing unit 1201, configured to parse a received bit stream to obtain a quantization depth parameter, where the quantization depth parameter is used to indicate a size of a minimum picture block having an independent QP in an LCU;

a parameter predicting unit 1202, configured to calculate a QP prediction value of each CU according to the size of the minimum picture block and a size of each CU included in the LCU;

a second parsing unit 1203, configured to parse, for each CU that satisfies a preset condition, the bit stream to obtain a QP difference of the CU;

a parameter calculating unit 1204, configured to calculate a QP of each CU according to the QP prediction value of each CU obtained by the parameter predicting unit 1202 and the QP difference obtained by parsing by the second parsing unit 1203; and a decoding unit 1205, configured to decode each CU according to the QP of each CU obtained by calculation by the parameter calculating unit 1204.

Figure 13:
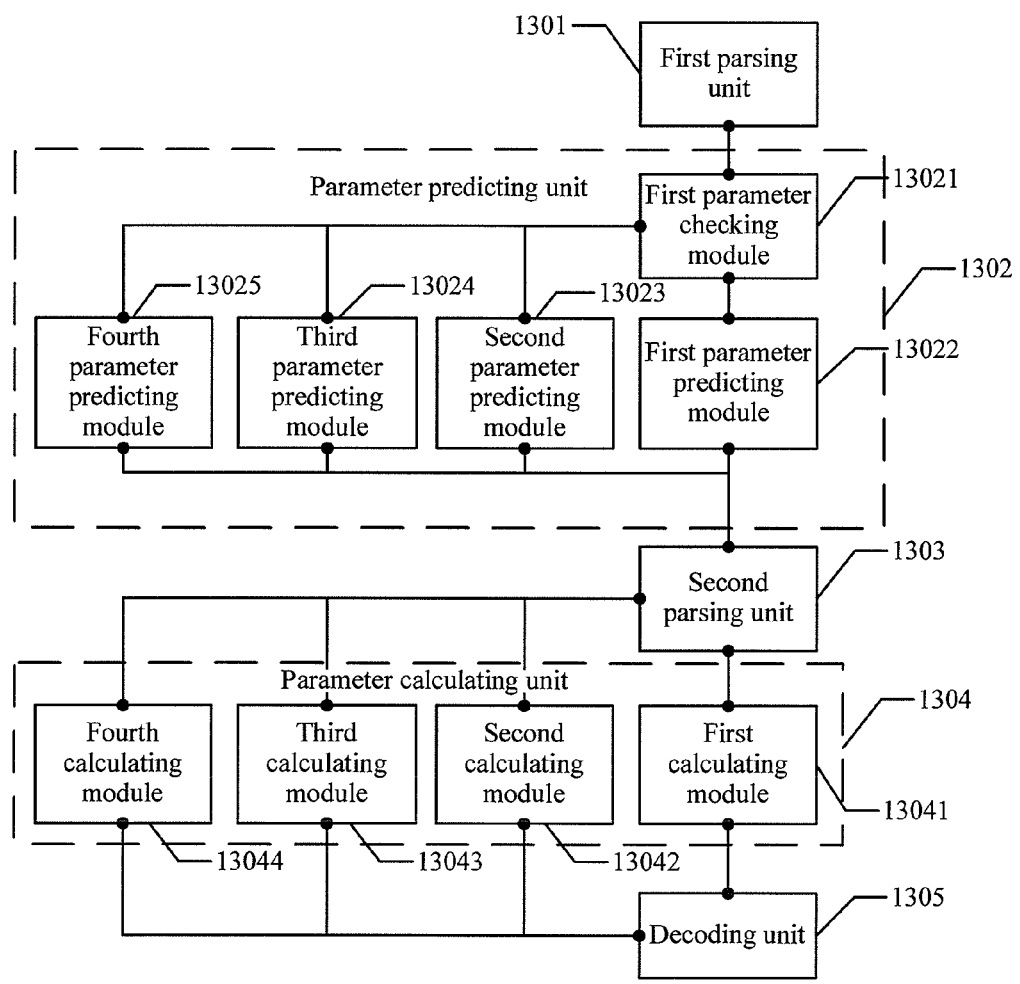
FIG. 13 is a schematic diagram of another embodiment of a decoding device according to the present invention.

For ease of understanding, the following describes a decoding device according to the present invention in detail. Referring to FIG. 13 specifically, another embodiment of the decoding device according to the present invention includes:

a first parsing unit 1301, configured to parse a received bit stream to obtain a quantization depth parameter, where the quantization depth parameter is used to indicate a size of a minimum picture block having an independent QP in an LCU;

a parameter predicting unit 1302, configured to calculate a QP prediction value of each CU according to the size of the minimum picture block and a size of each CU included in the LCU;

a second parsing unit 1303, configured to parse, for each CU that satisfies a preset condition, the bit stream to obtain a QP difference of the CU;

a parameter calculating unit 1304, configured to calculate a QP of each CU according to the QP prediction value of each CU obtained by the parameter predicting unit 1302 and the QP difference obtained by parsing by the second parsing unit 1303; and a decoding unit 1305, configured to decode each CU according to the QP of each CU obtained by calculation by the parameter calculating unit.

The parameter predicting unit 1302 may further include:

a first parameter checking module 13021, configured to judge, for each reference CU, whether CUs adjacent to the reference CU exist, where the CUs adjacent to the reference CU include a left CU, an upper CU, and an upper left CU of the reference CU, where, each CU whose size is greater than or equal to the size of the minimum picture block is used as a reference CU, and for a CU whose size is smaller than the size of the minimum picture block, an upper left CU of a minimum picture block to which the CU belongs is used as a reference CU;

a first parameter predicting module 13022, configured to determine, when none of the CUs adjacent to the reference CU exists, the QP prediction value of the reference CU according to a slice or picture to which the reference CU belongs;

a second parameter predicting module 13023, configured to use, when only the left CU of the reference CU exists, the QP of the left CU as the QP prediction value of the reference CU;

a third parameter predicting module 13024, configured to use, when only the upper CU of the reference CU exists, the QP of the upper CU as the QP prediction value of the reference CU; and a fourth parameter predicting module 13025, configured to obtain a first difference between the QP of the left CU and the QP of the upper left CU and a second difference between the QP of the upper CU and the QP of the upper left CU when all the CUs adjacent to the reference CU exist, and use the QP of the upper CU as the QP prediction value of the reference CU if the first difference is smaller than the second difference, or use the QP of the left CU as the QP prediction value of the reference CU if the first difference is greater than or equal to the second difference.

The parameter calculating unit 1304 in this embodiment may further include:

a first calculating module 13041, configured to use, for a CU that does not satisfy the preset condition and whose size is greater than or equal to the size of the minimum picture block, the QP prediction value of the CU as the QP of the CU;

a second calculating module 13042, configured to use, for a CU that satisfies the preset condition and whose size is greater than or equal to the size of the minimum picture block, a sum of the QP prediction value of the CU and the QP difference of the CU as the QP of the CU;

a third calculating module 13043, configured to obtain, for a CU whose size is smaller than the size of the minimum picture block, if the CU satisfies the preset condition, the QP prediction value of the upper left CU of the minimum picture block to which the CU belongs, and use a sum of the QP prediction value and the QP difference of the CU as the QP of the CU, and use the QP of the CU as the QP of all the CUs in the minimum picture block; and a fourth calculating module 13044, configured to obtain, for a CU whose size is smaller than the size of the minimum picture block, if none of the CUs in the minimum picture block to which the CU belongs satisfies the preset condition, the QP prediction value of the upper left CU of the minimum picture block to which the CU belongs, and use the QP prediction value as the QP of all the CUs in the minimum picture block.

Figure 14:
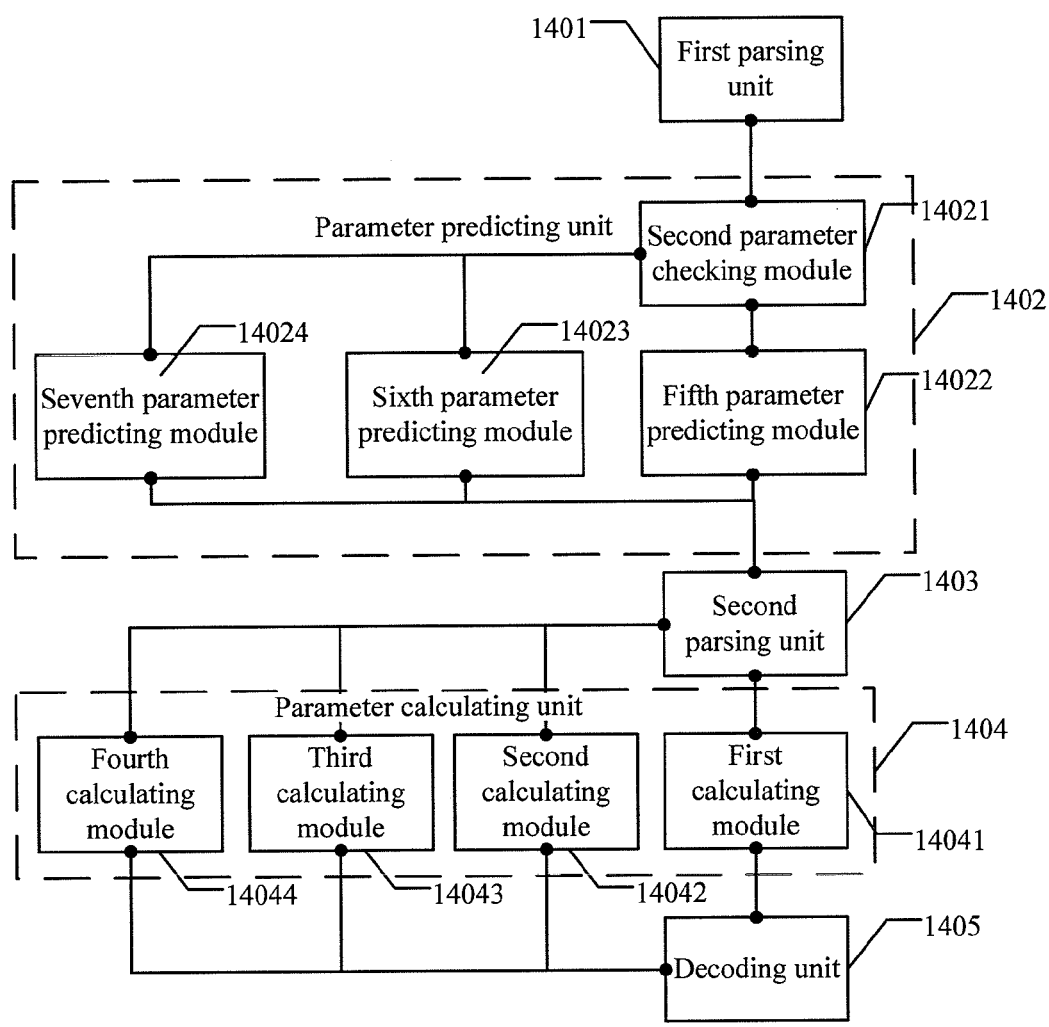
FIG. 14 is a schematic diagram of another embodiment of a decoding device according to the present invention.

Referring to FIG. 14, another embodiment of the decoding device according to the present invention includes:

a first parsing unit 1401, configured to parse a received bit stream to obtain a quantization depth parameter, where the quantization depth parameter is used to indicate a size of a minimum picture block having an independent QP in an LCU;

a parameter predicting unit 1402, configured to calculate a QP prediction value of each CU according to the size of the minimum picture block and a size of each CU included in the LCU;

a second parsing unit 1403, configured to parse, for each CU that satisfies a preset condition, the bit stream to obtain a QP difference of the CU;

a parameter calculating unit 1404, configured to calculate a QP of each CU according to the QP prediction value of each CU obtained by the parameter predicting unit 1402 and the QP difference obtained by parsing by the second parsing unit 1403; and a decoding unit 1405, configured to decode each CU according to the QP of each CU obtained by calculation by the parameter calculating unit.

The parameter predicting unit 1402 may further include:

a second parameter checking module 14021, configured to judge, for each reference CU, whether a left CU of the reference CU exists, where, each CU whose size is greater than or equal to the size of the minimum picture block is used as a reference CU, and for a CU whose size is smaller than the size of the minimum picture block, an upper left CU of a minimum picture block to which the CU belongs is used as a reference CU;

a fifth parameter predicting module 14022, configured to use, when the left CU of the reference CU exists, the QP of the left CU as the QP prediction value of the reference CU;

a sixth parameter predicting module 14023, configured to use, when the left CU of the reference CU does not exist, and an upper CU of the reference CU or a previous decoded CU of the reference CU exists, the QP of the upper CU or the QP of the previous decoded CU as the QP prediction value of the reference CU; and a seventh parameter predicting module 14024, configured to determine, when none of the left CU, the upper CU, and the previous decoded CU of the reference CU exists, the QP prediction value of the reference CU according to a slice or picture to which the reference CU belongs.

The parameter calculating unit 1404 in this embodiment may further include:

a first calculating module 14041, configured to use, for a CU that does not satisfy the preset condition and whose size is greater than or equal to the size of the minimum picture block, the QP prediction value of the CU as the QP of the CU;

a second calculating module 14042, configured to use, for a CU that satisfies the preset condition and whose size is greater than or equal to the size of the minimum picture block, a sum of the QP prediction value of the CU and the QP difference of the CU as the QP of the CU;

a third calculating module 14043, configured to obtain, for a CU whose size is smaller than the size of the minimum picture block, if the CU satisfies the preset condition, the QP prediction value of the upper left CU of the minimum picture block to which the CU belongs, and use a sum of the QP prediction value and the QP difference of the CU as the QP of the CU, and use the QP of the CU as the QP of all the CUs in the minimum picture block; and a fourth calculating module 14044, configured to obtain, for a CU whose size is smaller than the size of the minimum picture block, if none of the CUs in the minimum picture block to which the CU belongs satisfies the preset condition, the QP prediction value of the upper left CU of the minimum picture block to which the CU belongs, and use the QP prediction value as the QP of all the CUs in the minimum picture block.

In this embodiment, the encoder may write, during encoding, a quantization depth parameter into the data to be encoded, where the quantization depth parameter is used to indicate a size of a minimum picture block having an independent QP, and for each CU that satisfies a preset condition, carry a QP difference of the CU in the CU, so that each LCU does not correspond to only one QP. Therefore, the decoder may perform decoding for each CU during decoding without performing decoding for the whole LCU, and hence the decoding efficiency can be improved.

The technology provided by the embodiment of the present invention may be applied to the field of digital signal processing, and is implemented by an encoder or a decoder. The video encoder and decoder are widely applied to various communication devices or electronic devices, for example, a digital television, a set top box, a media gateway, a mobile phone, a wireless device, a personal digital assistant (PDA), a handheld or portable computer, a GPS receiver/navigation assistant, a camera, a video player, a camcorder, a video recorder, a surveillance device, a video conferencing and videophone device, and so on. Such devices include a processor, a memory, and an interface for transmitting data. The video encoder/decoder may be implemented directly by a digital circuit or chip, for example, a DSP (digital signal processor), or implemented by a software code for driving a processor to execute a procedure in the software code.

A person of ordinary skill in the art may understand that all or a part of the steps of the methods in the embodiments may be implemented by a program instructing relevant hardware. The program may be stored in a computer readable storage medium. The storage medium may be a read-only memory, a magnetic disk, or an optical disk.

What is claimed is:

1. An encoding method, comprising:
    obtaining, by an encoder, data to be encoded, wherein the data to be encoded is at least one largest coding unit (LCU);
    determining, by the encoder, a quantization depth parameter of the LCU, and adding the quantization depth parameter into the data to be encoded, wherein the quantization depth parameter is used to indicate a size of a minimum picture block having an independent quantization parameter (QP) in the LCU;
    determining, by the encoder, a QP of each coding unit (CU) in the LCU according to the size of the minimum picture block and a size of each CU;
    calculating, by the encoder, a QP difference of each CU according to the QP of each CU and a QP prediction value of each CU;
    carrying, by the encoder, in each CU that satisfies a preset condition, the QP difference of the CU; and
    encoding, by the encoder, the quantization depth parameter, the QP difference of the CU that satisfies the preset condition, and each CU to obtain a bit stream,
    wherein calculating, by the encoder, a QP difference of each CU according to the QP of each CU and a QP prediction value of each CU comprises:

using, by the encoder, each CU whose size is greater than or equal to the size of the minimum picture block as a reference CU;
    for a CU whose size is smaller than the size of the minimum picture block, determining, by the encoder, a minimum picture block to which the CU belongs, and using an upper left CU of the minimum picture block as a reference CU;
    calculating, by the encoder, the QP prediction value of each reference CU according to QPs of CUs adjacent to each reference CU;
    for each reference CU, using, by the encoder, a difference between the QP of the reference CU and the QP prediction value of the reference CU as the QP difference of the reference CU; and
    if other CUs are comprised in the minimum picture block to which the reference CU belongs, using, by the encoder, the QP difference of the reference CU as the QP difference of the other CUs;
    wherein calculating, by the encoder, the QP prediction value of each reference CU according to QPs of CUs adjacent to each reference CU comprises:
    for each reference CU, judging, by the encoder, whether the CUs adjacent to the reference CU exist, wherein the CUs adjacent to the reference CU comprise a left CU, an upper CU, and an upper left CU of the reference CU;
    if none of the CUs adjacent to the reference CU exists, determining the QP prediction value of the reference CU according to a slice or picture to which the reference CU belongs;
    if only the left CU of the reference CU exists, using the QP of the left CU as the QP prediction value of the reference CU;
    if only the upper CU of the reference CU exists, using the QP of the upper CU as the QP prediction value of the reference CU; and
    if all the CUs adjacent to the reference CU exist, obtaining a first difference between the QP of the left CU and the QP of the upper left CU and a second difference between the QP of the upper CU and the QP of the upper left CU, and if the first difference is smaller than the second difference, using the QP of the upper CU as the QP prediction value of the reference CU, or if the first difference is greater than or equal to the second difference, using the QP of the left CU as the QP prediction value of the reference CU.

2. The method according to claim 1, wherein:
    the data to be encoded is a sequence, or a picture, or a slice; and
    the quantization depth parameter is used to indicate a size of a minimum picture block having an independent QP in each LCU in the sequence, or picture, or slice.

3. The method according to claim 2, wherein adding the quantization depth parameter into the data to be encoded comprises:
    adding, by the encoder, the quantization depth parameter into a sequence parameter set of the sequence, or a picture parameter set of the picture, or slice header information of the slice.

4. The method according to claim 1, wherein:
    the data to be encoded is one LCU; and
    the quantization depth parameter is used to indicate a size of a minimum picture block having an independent QP in the one LCU.

5. The method according to claim 4, wherein adding the quantization depth parameter into the data to be encoded comprises:
adding, by the encoder, the quantization depth parameter into a first CU having a non-zero quantized transform coefficient in a compressed bit stream of the CU in the one LCU according to an encoding order.

6. The method according to claim 1, wherein determining, by the encoder, a QP of each CU according to the size of the minimum picture block and a size of each CU in the LCU comprises:
for a CU whose size is greater than or equal to the size of the minimum picture block, calculating, by the encoder, the QP of the CU according to the preset bit rate control algorithm; and
for a CU whose size is smaller than the size of the minimum picture block, determining, by the encoder, a minimum picture block to which the CU belongs, calculating a QP of the minimum picture block according to a preset bit rate control algorithm, and using the QP of the minimum picture block as the QP of all CUs in the minimum picture block.

7. The method according to claim 1, wherein calculating, by the encoder, the QP prediction value of each reference CU according to QPs of CUs adjacent to each reference CU comprises:
for each reference CU, judging, by the encoder, whether a left CU of the reference CU exists, and if the left CU of the reference CU exists, using the QP of the left CU as the QP prediction value of the reference CU;
if the left CU of the reference CU does not exist, and an upper CU of the reference CU or a previous encoded CU of the reference CU exists, using the QP of the upper CU or the QP of the previous encoded CU as the QP prediction value of the reference CU; and
if none of the left CU, the upper CU, and the previous encoded CU of the reference CU exists, determining the QP prediction value of the reference CU according to a slice or picture to which the reference CU belongs.

8. The method according to claim 1, wherein:
encoding, by the encoder, the quantization depth parameter comprises:
using, by the encoder, a fixed-length code or a variable-length code to perform a binary transform for the quantization depth parameter to obtain a corresponding binary code word; and
adding, by the encoder, the obtained binary code word into the bit stream according to a method of fixed-length encoding, variable-length encoding, or arithmetic entropy encoding; and
encoding, by the encoder, the QP difference of the CU that satisfies the preset condition comprises:
using, by the encoder, a variable-length code to perform a binary transform for the QP difference of the CU that satisfies the preset condition to obtain a corresponding binary code word; and
adding, by the encoder, the obtained binary code word into the bit stream according to a method of variable-length encoding or arithmetic entropy encoding.

9. A decoding method, comprising:
parsing, by a decoder, a received bit stream to obtain a quantization depth parameter, wherein the quantization depth parameter is used to indicate a size of a minimum picture block having an independent quantization parameter (QP) in a largest coding unit (LCU);
calculating, by the decoder, a QP prediction value of each coding unit (CU) according to the size of the minimum picture block and a size of each CU in the LCU;
for each CU that satisfies a preset condition, parsing, by the decoder, the bit stream to obtain a QP difference of the CU;
calculating, by the decoder, a QP of each CU according to the QP prediction value of each CU and the QP difference obtained by parsing; and
decoding, by the decoder, each CU according to the QP of each CU;
wherein parsing, by a decoder, a received bit stream to obtain a quantization depth parameter comprises:
for each LCU, parsing, by the decoder, a first CU having a non-zero quantized transform coefficient in a compressed bit stream of the CU according to a decoding order to obtain the quantization depth parameter;
wherein the quantization depth parameter is used to indicate a size of a minimum picture block having an independent QP in an LCU to which the CU having a non-zero quantized transform coefficient in the compressed bit stream of the CU belongs;
wherein calculating, by the decoder, a QP prediction value of each CU according to the size of the minimum picture block and a size of each CU in the LCU comprises:
using, by the decoder, each CU whose size is greater than or equal to the size of the minimum picture block as a reference CU;
for a CU whose size is smaller than the size of the minimum picture block, determining, by the decoder, a minimum picture block to which the CU belongs, and using an upper left CU of the minimum picture block as a reference CU;
for each reference CU, judging, by the decoder, whether CUs adjacent to the reference CU exist, wherein the CUs adjacent to the reference CU comprise a left CU, an upper CU, and an upper left CU of the reference CU;
if none of the CUs adjacent to the reference CU exists, determining the QP prediction value of the reference CU according to a slice or picture to which the reference CU belongs;
if only the left CU of the reference CU exists, using the QP of the left CU as the QP prediction value of the reference CU;
if only the upper CU of the reference CU exists, using the QP of the upper CU as the QP prediction value of the reference CU; and
if all the CUs adjacent to the reference CU exist, obtaining a first difference between the QP of the left CU and the QP of the upper left CU and a second difference between the QP of the upper CU and the QP of the upper left CU, and if the first difference is smaller than the second difference, using the QP of the upper CU as the QP prediction value of the reference CU, or if the first difference is greater than or equal to the second difference, using the QP of the left CU as the QP prediction value of the reference CU.

10. The method according to claim 9, wherein parsing, by a decoder, a received bit stream to obtain a quantization depth parameter comprises:

parsing, by the decoder, a sequence parameter set of a sequence, or a picture parameter set of a picture, or slice header information of a slice to obtain the quantization depth parameter;
wherein, the quantization depth parameter is used to indicate a size of a minimum picture block having an independent QP in each LCU in the sequence, or picture, or slice.

11. The method according to claim 9, wherein calculating, by the decoder, a QP prediction value of each CU according to the size of the minimum picture block and a size of each CU comprised in the LCU comprises:
using, by the decoder, each CU whose size is greater than or equal to the size of the minimum picture block as a reference CU;
for a CU whose size is smaller than the size of the minimum picture block, determining, by the decoder, a minimum picture block to which the CU belongs, and using an upper left CU of the minimum picture block as a reference CU;
for each reference CU, judging, by the decoder, whether a left CU of the reference CU exists, and if the left CU of the reference CU exists, using the QP of the left CU as the QP prediction value of the reference CU;
if the left CU of the reference CU does not exist, and an upper CU of the reference CU or a previous decoded CU of the reference CU exists, using the QP of the upper CU or the QP of the previous decoded CU as the QP prediction value of the reference CU; and
if none of the left CU, the upper CU, and the previous decoded CU of the reference CU exists, determining the QP prediction value of the reference CU according to a slice or picture to which the reference CU belongs.

12. The method according to claim 9, wherein parsing, by the decoder for each CU that satisfies a preset condition, the bit stream to obtain a QP difference of the CU comprises:
for each CU whose size is greater than or equal to the size of the minimum picture block, judging, by the decoder, whether the CU satisfies the preset condition, and if so, parsing the CU to obtain the QP difference of the CU, or if not, setting the QP difference of the CU to 0; and
for a CU whose size is smaller than the size of the minimum picture block, determining, by the decoder, the minimum picture block to which the CU belongs, and judging, in turn according to the decoding order of CUs in the minimum picture block, whether each CU in the minimum picture block satisfies the preset condition, and if so, stopping judgment, and using the QP difference of the CU as the QP difference of all the CUs in the minimum picture block, or if none of the CUs in the minimum picture block satisfies the preset condition, setting the QP difference of all the CUs in the minimum picture block to 0.

13. The method according to claim 12, wherein:
the CU that satisfies the preset condition is the CU having a non-zero quantized transform coefficient in the compressed bit stream of the CU;
calculating, by the decoder, a QP of each CU according to the QP prediction value of each CU and the QP difference obtained by parsing comprises:
for a CU that does not satisfy the preset condition and whose size is greater than or equal to the size of the minimum picture block, using, by the decoder, the QP prediction value of the CU as the QP of the CU;
for a CU that satisfies the preset condition and whose size is greater than or equal to the size of the minimum picture block, using, by the decoder, a sum of the QP prediction value of the CU and the QP difference of the CU as the QP of the CU;
for a CU whose size is smaller than the size of the minimum picture block, if the CU satisfies the preset condition, obtaining, by the decoder, the QP prediction value of the upper left CU of the minimum picture block to which the CU belongs, and using a sum of the QP prediction value and the QP difference as the QP of the CU, and using the QP of the CU as the QP of all the CUs in the minimum picture block; and
for a CU whose size is smaller than the size of the minimum picture block, if none of the CUs in the minimum picture block to which the CU belongs satisfies the preset condition, obtaining, by the decoder, the QP prediction value of the upper left CU of the minimum picture block to which the CU belongs, and using the QP prediction value as the QP of all the CUs in the minimum picture block.

14. The method according to claim 12, wherein:
parsing, by a decoder, a received bit stream to obtain a quantization depth parameter comprises:
obtaining, by the decoder, a binary code word from a corresponding position by using a method of fixed-length decoding, variable-length decoding, or arithmetic entropy decoding; and
using, by the decoder, a fixed-length code or a variable-length code to perform an inverse binary transform for the binary code word to obtain the quantization depth parameter; and
parsing, by the decoder, the bit stream to obtain a QP difference of the CU comprises:
obtaining, by the decoder, a binary code word from a corresponding position by using a method of variable-length decoding or arithmetic entropy decoding; and
using, by the decoder, a variable-length code to perform an inverse binary transform for the binary code word to obtain the QP difference.

15. An encoding device, comprising:
a data obtaining unit, configured to obtain data to be encoded, wherein the data to be encoded is at least one largest coding unit (LCU);
a depth parameter processing unit, configured to determine a quantization depth parameter of the LCU according to a preset bit rate control algorithm, and write the quantization depth parameter into the data to be encoded which is obtained by the data obtaining unit, wherein the quantization depth parameter is used to indicate a size of a minimum picture block having an independent quantization parameter (QP) in the LCU;
a quantization parameter determining unit, configured to determine a QP of each coding unit (CU) according to the size of the minimum picture block and a size of each CU in the LCU;
a calculating unit, configured to calculate a QP difference of each CU according to the QP of each CU determined by the quantization parameter determining unit and a QP prediction value of each CU;
a filling unit, configured to carry, for each CU that satisfies a preset condition, the QP difference of the CU in the CU;
an encoding unit, configured to encode the quantization depth parameter, the QP difference of the CU that satisfies the preset condition, and each CU to obtain a bit stream; and a predicting unit, configured to calculate the QP prediction value of each reference CU according to QPs of CUs adjacent to each reference CU;

wherein, each CU whose size is greater than or equal to the size of the minimum picture block is used as a reference CU, and for a CU whose size is smaller than the size of the minimum picture block, an upper left CU of a minimum picture block to which the CU belongs is used as a reference CU;

wherein the predicting unit comprises:
 a first checking module, configured to judge, for each reference CU, whether CUs adjacent to the reference CU exist, wherein the CUs adjacent to the reference CU comprise a left CU, an upper CU, and an upper left CU of the reference CU;
 a first predicting module, configured to determine, when none of the CUs adjacent to the reference CU exists, the QP prediction value of the reference CU according to a slice or picture to which the reference CU belongs;
 a second predicting module, configured to use, when only the left CU of the reference CU exists, the QP of the left CU as the QP prediction value of the reference CU;
 a third predicting module, configured to use, when only the upper CU of the reference CU exists, the QP of the upper CU as the QP prediction value of the reference CU; and
 a fourth predicting module, configured to obtain a first difference between the QP of the left CU and the QP of the upper left CU and a second difference between the QP of the upper CU and the QP of the upper left CU when all the CUs adjacent to the reference CU exist, and use the QP of the upper CU as the QP prediction value of the reference CU if the first difference is smaller than the second difference, or use the QP of the left CU as the QP prediction value of the reference CU if the first difference is greater than or equal to the second difference.

16. The encoding device according to claim 15, wherein the predicting unit comprises:
 a second checking module, configured to judge, for each reference CU, whether a left CU of the reference CU exists;
 a fifth predicting module, configured to use, when the left CU of the reference CU exists, the QP of the left CU as the QP prediction value of the reference CU;
 a sixth predicting module, configured to use, when the left CU of the reference CU does not exist, and an upper CU of the reference CU or a previous encoded CU of the reference CU exists, the QP of the upper CU or the QP of the previous encoded CU as the QP prediction value of the reference CU; and
 a seventh predicting module, configured to determine, when none of the left CU, the upper CU, and the previous encoded CU of the reference CU exists, the QP prediction value of the reference CU according to a slice or picture to which the reference CU belongs.

17. A decoding device, comprising:
 a first parsing unit, configured to parse a received bit stream to obtain a quantization depth parameter, wherein the quantization depth parameter is used to indicate a size of a minimum picture block having an independent quantization parameter (QP) in an largest coding unit (LCU);
 a parameter predicting unit, configured to calculate a QP prediction value of each coding unit (CU) according to the size of the minimum picture block and a size of each CU in the LCU;
 a second parsing unit, configured to parse, for each CU that satisfies a preset condition, the bit stream to obtain a QP difference of the CU;
 a parameter calculating unit, configured to calculate a QP of each CU according to the QP prediction value of each CU obtained by the parameter predicting unit and the QP difference obtained by parsing by the second parsing unit; and
 a decoding unit, configured to decode each CU according to the QP of each CU obtained by calculation by the parameter calculating unit;
wherein the parameter predicting unit comprises:
 a first parameter checking module, configured to judge, for each reference CU, whether CUs adjacent to the reference CU exist, wherein the CUs adjacent to the reference CU comprise a left CU, an upper CU, and an upper left CU of the reference CU, wherein, each CU whose size is greater than or equal to the size of the minimum picture block is used as a reference CU, and for a CU whose size is smaller than the size of the minimum picture block, an upper left CU of a minimum picture block to which the CU belongs is used as a reference CU;
 a first parameter predicting module, configured to determine, when none of the CUs adjacent to the reference CU exists, the QP prediction value of the reference CU according to a slice or picture to which the reference CU belongs;
 a second parameter predicting module, configured to use, when only the left CU of the reference CU exists, the QP of the left CU as the QP prediction value of the reference CU;
 a third parameter predicting module, configured to use, when only the upper CU of the reference CU exists, the QP of the upper CU as the QP prediction value of the reference CU; and
 a fourth parameter predicting module, configured to obtain a first difference between the QP of the left CU and the QP of the upper left CU and a second difference between the QP of the upper CU and the QP of the upper left CU when all the CUs adjacent to the reference CU exist, and use the QP of the upper CU as the QP prediction value of the reference CU if the first difference is smaller than the second difference, or use the QP of the left CU as the QP prediction value of the reference CU if the first difference is greater than or equal to the second difference.

18. The decoding device according to claim 17, wherein the parameter predicting unit comprises:
 a second parameter checking module, configured to judge, for each reference CU, whether a left CU of the reference CU exists, wherein, each CU whose size is greater than or equal to the size of the minimum picture block is used as a reference CU, and for a CU whose size is smaller than the size of the minimum picture block, an upper left CU of a minimum picture block to which the CU belongs is used as a reference CU;
 a fifth parameter predicting module, configured to use, if the left CU of the reference CU exists, the QP of the left CU as the QP prediction value of the reference CU;
 a sixth parameter predicting module, configured to use, if the left CU of the reference CU does not exist, and an upper CU of the reference CU or a previous decoded CU of the reference CU exists, the QP of the upper CU or the QP of the previous decoded CU as the QP prediction value of the reference CU; and a seventh parameter predicting module, configured to determine, if none of the left CU, the upper CU, and the previous decoded CU of the reference CU exists, the QP prediction value of the reference CU according to a slice or picture to which the reference CU belongs.

19. The decoding device according to claim 18, wherein the parameter calculating unit comprises:

a first calculating module, configured to use, for a CU that does not satisfy the preset condition and whose size is greater than or equal to the size of the minimum picture block, the QP prediction value of the CU as the QP of the CU;

a second calculating module, configured to use, for a CU that satisfies the preset condition and whose size is greater than or equal to the size of the minimum picture block, a sum of the QP prediction value of the CU and the QP difference of the CU as the QP of the CU;

a third calculating module, configured to obtain, for a CU whose size is smaller than the size of the minimum picture block, if the CU satisfies the preset condition, the QP prediction value of the upper left CU of the minimum picture block to which the CU belongs, and use a sum of the QP prediction value and the QP difference of the CU as the QP of the CU, and use the QP of the CU as the QP of all the CUs in the minimum picture block; and a fourth calculating module, configured to obtain, for a CU whose size is smaller than the size of the minimum picture block, if none of the CUs in the minimum picture block to which the CU belongs satisfies the preset condition, the QP prediction value of the upper left CU of the minimum picture block to which the CU belongs, and use the QP prediction value as the QP of all the CUs in the minimum picture block.

* * * * *